US012086827B2

(12) United States Patent
Dorris, Jr. et al.

(10) Patent No.: US 12,086,827 B2
(45) Date of Patent: Sep. 10, 2024

(54) COMPUTER-IMPLEMENTED SYSTEMS AND METHODS FOR MANAGING USER ACCOUNT DATA AND AWARD REDEMPTIONS

(71) Applicant: POARCH BAND OF CREEK INDIANS, d/b/a PCI GAMING AUTHORITY, Atmore, AL (US)

(72) Inventors: James F. Dorris, Jr., Spanish Fort, AL (US); Kenneth William Rohman, III, Gulf Shores, AL (US); Brian Franklin Bell, Walnut Hill, FL (US); Peter Anderson, Northbrook, IL (US); Candy Kirby Fralick, Atmore, AL (US); Jessica Milton, Wetumpka, AL (US)

(73) Assignee: POARCH BAND OF CREEK INDIANS, Atmore, AL (US)

( * ) Notice: Subject to any disclaimer, the term of this patent is extended or adjusted under 35 U.S.C. 154(b) by 0 days.

(21) Appl. No.: 17/971,011

(22) Filed: Oct. 21, 2022

(65) Prior Publication Data
US 2023/0125352 A1   Apr. 27, 2023

Related U.S. Application Data

(60) Provisional application No. 63/262,860, filed on Oct. 21, 2021.

(51) Int. Cl.
*G06Q 30/00* (2023.01)
*G06Q 30/0207* (2023.01)
(52) U.S. Cl.
CPC ..... *G06Q 30/0236* (2013.01); *G06Q 30/0239* (2013.01)
(58) Field of Classification Search
CPC ............. G06Q 30/0236; G06Q 30/0239
See application file for complete search history.

(56) References Cited

U.S. PATENT DOCUMENTS 6,587,127 B1   7/2003   Leeke et al.
2002/0010025 A1   1/2002   Kelly et al.
(Continued)

OTHER PUBLICATIONS

International Search Report and Written Opinion mailed Feb. 2, 2023, in International Application No. PCT/US2022/078514 (10 pages).

*Primary Examiner* — Meredith A Long
(74) *Attorney, Agent, or Firm* — FINNEGAN, HENDERSON, FARABOW, GARRETT & DUNNER LLP

(57) ABSTRACT

Computer-implemented systems and methods are provided for managing user account data and award redemptions. In one embodiment, a system is provided that includes a web server configured to operate an online platform that enables a user to activate an award enhancement option for an award. The system also includes a data integration server communicatively coupled to the server. The data integration server may be configured to receive, from the web server, first identity data representing an identity of the user and activation data identifying the award enhancement option activated by the user, and store, in a memory device, the activation data with account data of the user. The system may also include an award management server communicatively coupled to the data integration server and configured to: receive second identity data and validation data associated with the user, the validation data confirming that the user is eligible for the award; query the data integration server based on the second identity data and obtain the activation data associated with the user; determine, based on at least one of the validation data and the activation data, whether the user qualifies for the award enhancement option for the award; and when it is determined that the user qualifies for the award enhancement option, automatically (Continued)

update the account data of the user to include redemption data indicating that the user is authorized to receive the award enhancement option.

24 Claims, 12 Drawing Sheets

(56) References Cited

U.S. PATENT DOCUMENTS

| | | |
|---|---|---|
| 2002/0077169 A1 | 6/2002 | Kelly et al. |
| 2011/0112892 A1* | 5/2011 | Tarantino .............. A63F 13/332 |
| | | 705/14.1 |
| 2011/0281642 A1* | 11/2011 | Hardy ................. G07F 17/3262 |
| | | 463/25 |
| 2013/0090750 A1 | 4/2013 | Herrman et al. |
| 2016/0307214 A1* | 10/2016 | Fralick ................. G06Q 10/067 |

\* cited by examiner

1000

Hi, Joe, your STORE purchase is ready to be redeemed. Please see details below.

Extra Entries Showers of Cash
Redeem this award enhancement and receive 25 extra drawing entries into Showers of Cash promotion on Fridays in April. Must be redeemed 15 minutes prior to the start of the promotion.
VALID FROM: 04/01/2021
VALID TO: 04/23/2021

BALANCE BEFORE PURCHASE: 168,500
REWARD PRICE: 0
BALANCE AFTER PURCHASE: 168,500

Thanks for visiting out website! Be sure to stop by every day for a chance to win more prizes and Find Your Winning Moment!

1002 — PLAY NOW

FIG. 10

COMPUTER-IMPLEMENTED SYSTEMS AND METHODS FOR MANAGING USER ACCOUNT DATA AND AWARD REDEMPTIONS

CROSS REFERENCE TO RELATED APPLICATION(S)

This application claims priority to U.S. Provisional Application No. 63/262,860, filed Oct. 21, 2021, the contents of which is hereby incorporated by reference in its entirety.

TECHNICAL FIELD

The present disclosure generally relates to the field of computing systems and data processing systems and methods. More specifically, and without limitation, this disclosure relates to computer-implemented systems and methods for managing user account data and award redemptions. The systems and methods disclosed herein may be used in various applications, including applications that support redemptions for different types of awards and award enhancements. The systems and methods disclosed herein also relate to applications for activating different award enhancement options, synchronizing activation data, validating users for award redemptions, and providing flexibility to allow various types of award redemptions.

BACKGROUND

Data management systems are used to collect data and store and manage the collected data. A variety of computing and data processing components may be used to evaluate, and process collected data. However, extant systems may only support a finite set of data processing operations or functions. Further, some extant systems may only be programmed or reconfigured by highly trained software developers or data scientists. Such features limit the use or flexibility of the system and/or increase the cost of managing data over time.

Data management systems have been used in the gaming industry for managing user account data and awards. However, several technical challenges exist in such extant systems. For example, at any given time, one or more users may be eligible for one or more promotions or awards. There exists a technical challenge of synchronizing or matching particular promotions or awards to particular users depending on, for example, activation state(s), user status and/or achievements, and other criteria. Also, there exists a technical challenge of securely and efficiently validating users and confirming when a specific user is qualified to receive a promotion or award, including those restricted by time, location, activities, and/or other eligibility conditions.

Still further, the inventors of the present application have observed that there is a need for flexibility in how redemptions are completed. For some promotions or awards, it may be preferrable that the redemption is done automatically, such as with a computer-implemented system. In other cases, it may be preferrable that the redemption is done manually (e.g., by an administrator), particularly where physical presence/entry and/or a physical award is involved. Moreover, validations for redemptions may be challenging on several levels. For example, there may be various conditions or rules to validate the identity of a user. Also, there may be various conditions or rules that need to be applied to determine if a specific user is eligible to receive an award or promotion. In some cases, it may be necessary to receive and process data from different sources and apply conditions or rules to that data associated with the validation process.

In view of the foregoing drawbacks and technical challenges, there is a need for improved computing and data processing systems, including improved computer-implemented systems and methods for managing user account data and award redemptions.

SUMMARY

Consistent with embodiments of the present disclosure, systems, methods, and non-transitory computer-readable media are provided for managing user account data and award redemptions.

Embodiments of the present disclosure relate to systems and methods that may be used over a wide range of applications, including where there is a need to support redemptions for different types of awards. Embodiments of the present disclosure also relate to systems and methods where an award enhancement option for an award is activated by a user and the user is validated before redeeming the activated award enhancement option. As further disclosed herein, an award enhancement option may include at least one of a credit, a voucher, a coupon, a discount, one or more points, an advancement, a multiplied award, a prize, a pass, a subscription, or an enrollment.

Consistent with the present disclosure, a system of one or more computing apparatuses may be configured to perform particular operations or actions by virtue of having software, firmware, hardware, or a combination of them installed thereon that in operation causes or cause the computing apparatus to perform the operations or actions. One or more computer programs may be configured to perform operations or actions by virtue of including instructions that, when executed by a data processing apparatus (such as one or more processors), cause the apparatus to perform such operations or actions.

One aspect of the present disclosure includes a computer-implemented system for managing user account data and award redemptions. The computer-implemented system may include a web server configured to operate an online platform that enables a user to activate an award enhancement option for an award. In some embodiments, the web server may be further configured to enable the user to activate the award enhancement option by applying points obtained by the user by playing at least one online game or performing other activities. In some embodiments, the web server may be further configured to generate a graphical interface to display account data of the user, including the redemption data indicating that the user is authorized to receive the award enhancement option. In some embodiments, the web server may be further configured to operate the online platform that enables a plurality of users to play one or more online games and obtain points to activate award enhancement options.

The computer-implemented system may also include a data integration server communicatively coupled to the web server. The data integration server may be configured to receive, from the web server, first identity data representing an identity of the user and activation data identifying the award enhancement option activated by the user, and store, in a memory device, the activation data with account data of the user.

The computer-implemented system may further include an award management server communicatively coupled to the data integration server. The award management server may be configured to: receive second identity data and validation data associated with the user, the second identity data including data representing an identity of the user, and the validation data confirming that the user is eligible for the award; query the data integration server based on the second identity data and obtain the activation data associated with the account data of the user; determine, based on at least one of the validation data and the activation data, whether the user qualifies for the award enhancement option for the award; and when it is determined that the user qualifies for the award enhancement option for the award, automatically update the account data of the user to include redemption data indicating that the user is authorized to receive the award enhancement option. The award management server may be further configured to generate reporting data to report authorization of the award enhancement option to the user. The award management server may be further configured to update the account data to include an award enhancement based on the award enhancement option. For example, the award enhancement may include data representing at least one of a credit, a voucher, a coupon, a discount, one or more points, an advancement, a multiplied award, a prize, a pass, a subscription, or an enrollment. In some embodiments, the award management server may be further configured to determine whether the user qualifies for the award enhancement option for the award based on activity data stored with the account data of the user.

In some embodiments, the web server may be further configured to enable the user to enroll, through the online platform, in a promotion to receive the award; and when the user enrolls in the promotion, the web server is further configured to generate the validation data confirming that the user is eligible for the award associated with the promotion. In some embodiments, the award management server may be further configured to determine whether a required activity is performed by the user on or before a predetermined expiration date, and determine that the user is qualified for the award enhancement option for the award when the required activity is determined to be performed on or before the expiration date.

In some embodiments, the award may be a first award and the validation data may include first award data identifying the first award. The activation data for the award enhancement option may include second award data identifying a second award associated with the award enhancement option, and the management server may be further configured to determine whether the user is qualified for the award enhancement option by comparing the first award data with the second award data. In some embodiments, the user is determined to be qualified for the award enhancement option when first award and the second award are the same award.

In some embodiments, the system may further include at least one reporting device communicatively coupled to the data integration server, each reporting device configured to generate activity data in response to the user performing one or more activities. Further, the data integration server may be further configured to store, in the memory device, the activity data with the account data of the user. Each reporting device may be further configured to validate the identity of the user and transmit the second identity data with the activity data to the data integration server when the identity of the user is validated. By way of example, the at least one reporting device may include at least one of a gaming server, a website server, an electronic gaming machine, a security server, a smartphone, a point of sale device, a bar code reader, a magnetic card reader, a contactless chip detector, a biometric reader, a video camera, a geo-location detector, or a beacon reader. The one or more activities may include at least one of the user visiting a website, the user visiting a physical location, the user staying at a physical location for a predetermined amount of time, the user playing an online game, the user playing a game at a physical location, or the user achieving a predetermined achievement or result in a designated game.

Another aspect includes a computer-implemented system for managing user account data and award redemptions of award enhancements. The computer-implemented system may include a first server configured to store first identity data representing an identity of the user and activation data identifying an award enhancement option for an award that was activated by the user. The system may further include a second server communicatively coupled to the first server and configured to: receive second identity data and validation data associated with the user, the second identity data including data representing an identity of the user, and the validation data confirming that the user is eligible for the award; query the first server based on the second identity data and obtain the activation data associated with the user; determine, based on at least one of the validation data and the activation data, whether the user qualifies for the award enhancement option for the award; and when it is determined that the user qualifies for the award enhancement option for the award, automatically update the account data of the user to include redemption data indicating that the user is authorized to receive the award enhancement option.

Still another aspect of the present disclosure includes a computer-implemented method for managing user account data and award redemptions. The method may include steps performed by at least one processor. For example, the method includes obtaining first identity data representing an identity of the user, second identity data including data representing an identity of the user, and validation data associated with the user and confirming that the user is eligible for an award; obtaining activation data identifying an award enhancement option that was activated by the user; determining, based on at least one of the validation data and the activation data, whether the user qualifies for the award enhancement option for the award; and when it is determined that the user qualifies for the award enhancement option for the award, automatically updating account data of the user to include redemption data indicating that the user is authorized to receive the award enhancement option.

Embodiments may include one or more of the following features. The method performed by the at least one processor may further include generating reporting data to report authorization of the award enhancement option to the user. The method may further include updating the account data to include an award enhancement based on the award enhancement option. The award enhancement may include data representing at least one of a credit, a voucher, a coupon, a discount, one or more points, an advancement, a multiplied award, a prize, a pass, a subscription, or an enrollment. The method may further include obtaining, from at least one reporting device, activity data in response to the user performing one or more activities. The at least one reporting device may comprise at least one of a gaming server, a website server, an electronic gaming machine, a security server, a smartphone, a point of sale device, a bar code reader, a magnetic card reader, a contactless chip detector, a biometric reader, a video camera, a geo-location detector, or a beacon reader. The one or more activities may comprise at least one of the user visiting a website, the user visiting a physical location, the user staying at a physical location for a predetermined amount of time, the user playing an online game, the user playing a game at a physical location, or the user achieving a predetermined achievement or result in a designated game.

The method may further include validating the identity of the user. Further, the method may include determining whether the user qualifies for the award enhancement option for the award based on activity data stored with the account data of the user. In some embodiments, the activity data is obtained from one or more reporting devices.

Additionally, embodiments may include one or more of the following features. The method includes enabling the user to enroll, through an online platform, in a promotion to receive the award, and when the user enrolls in the promotion, generating the validation data confirming that the user is eligible for the award associated with the promotion. The method may further include enabling the user to activate the award enhancement option by applying points obtained by the user by playing at least one online game or performing other activities. The method may further include determining whether a required activity is performed by the user on or before a predetermined expiration date; and determining that the user is qualified for the award enhancement option for the award when the required activity is determined to be performed on or before the expiration date.

Still further, embodiments may include one or more of the following features. The award may be a first award and the validation data may include first award data identifying the first award. The activation data for the award enhancement option may include second award data identifying a second award associated with the award enhancement option. The method may further include determining whether the user is qualified for the award enhancement option by comparing the first award data with the second award data. In some embodiments, the user is determined to be qualified for the award enhancement option when the first award and the second award are the same awards.

The method may further include comprising generating a graphical interface to display account data of the user, including the redemption data indicating that the user is authorized to receive the award enhancement option. The method may further include operating an online platform that enables a plurality of users to play one or more online games and obtain credits to activate award enhancement options.

Systems and methods consistent with the present disclosure may be implemented using any suitable combination of software, firmware, and hardware. Embodiments of the present disclosure may include programs or instructions that are machine constructed and/or programmed specifically for performing functions associated with the disclosed operations or actions. Still further, non-transitory computer-readable storage media may be used that store program instructions, which are executable by at least one processor to perform the steps and/or methods described herein.

It will be understood that the foregoing description and the following detailed description are exemplary and explanatory only, and are not restrictive of the disclosed embodiments.

BRIEF DESCRIPTION OF DRAWING(S)

Reference will now be made to the accompanying drawings which illustrate exemplary embodiments of the present disclosure and in which:

FIG. 10 illustrates another example graphical user interface for displaying information related to an activated award enhancement option, consistent with embodiments of this disclosure.

DETAILED DESCRIPTION

Figure 1:
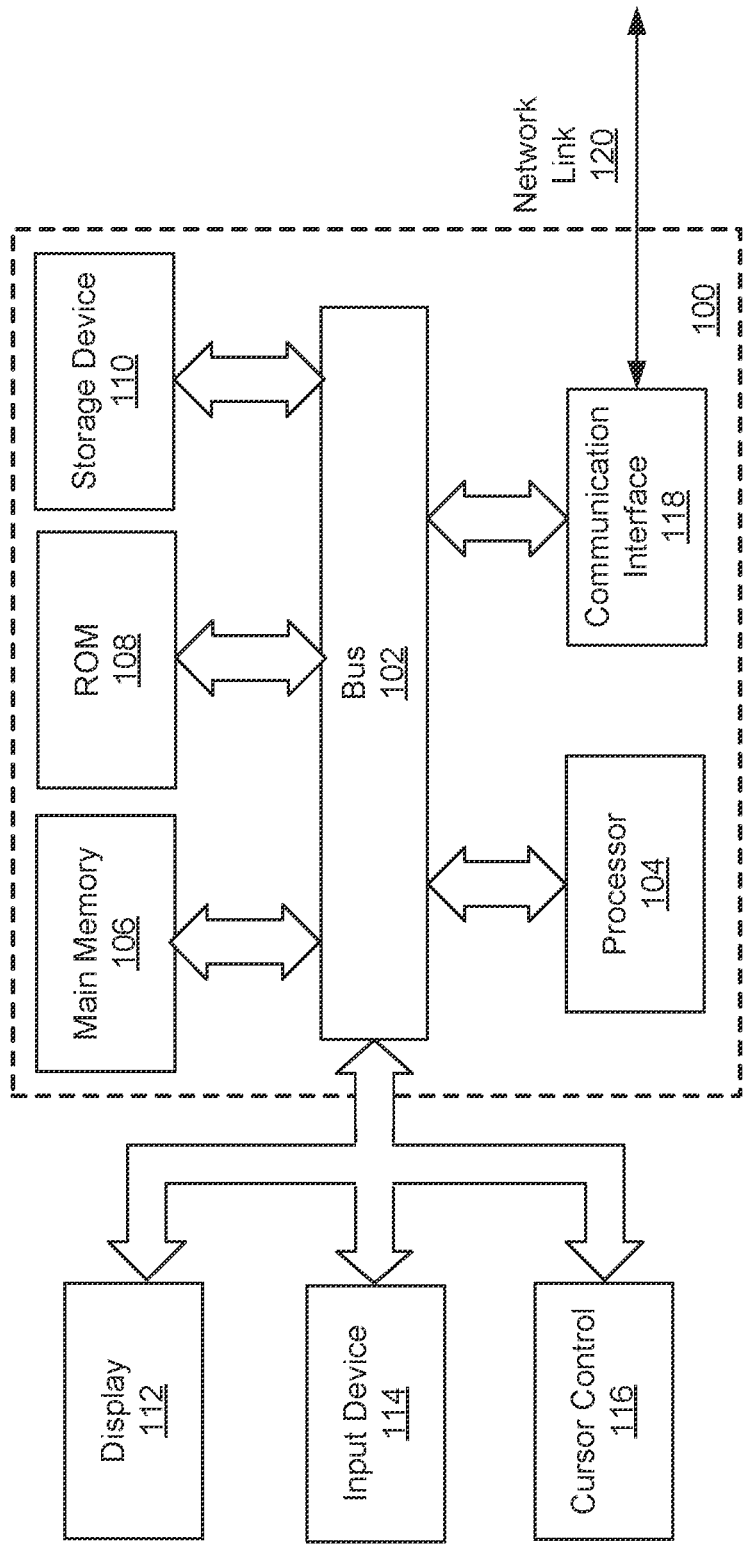
FIG. 1 illustrates an example computing apparatus for implementing systems and methods for managing user account data and award redemptions, consistent with embodiments of this disclosure.

Reference will now be made in detail to exemplary embodiments of the computer-implemented systems and methods of the present disclosure, examples of which are illustrated in the accompanying drawings. Wherever possible, the same reference numbers will be used throughout the drawings to refer to the same or like parts. The terminology used in the description presented herein is not intended to be interpreted in any limited or restrictive manner simply because it is being utilized in conjunction with a detailed description of certain specific embodiments. Furthermore, the described embodiments include several novel features, no single one of which is solely responsible for its desirable attributes or which is essential to the systems and methods described herein.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C. The term "and/or" in this disclosure, unless specifically stated otherwise or infeasible, is used interchangeably with and considered equivalent as the term "or."

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its purpose is to present some features of one or more embodiments in a simplified form as a prelude to the more detailed description presented later. For convenience, the term "certain embodiments" or "example embodiment" may be used herein to refer to a single embodiment or multiple embodiments of the disclosure.

Embodiments described herein may refer to a non-transitory computer readable medium including instructions that when executed by at least one processor, cause the at least one processor to perform a method or set of operations described herein. Non-transitory computer readable mediums may be any medium capable of storing data in any memory in a way that may be read by any computing device with a processor to carry out methods or any other instructions stored in the memory. The non-transitory computer readable medium may be implemented as software, firmware, hardware, or any combination thereof. Software may preferably be implemented as an application program tangibly embodied on a program storage unit or computer readable medium consisting of parts, or of certain devices and/or a combination of devices. The application program may be uploaded to, and executed by, a computing apparatus or machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

Memory may include any mechanism for storing electronic data or instructions, including Random Access Memory (RAM), a Read-Only Memory (ROM), a hard disk, an optical disk, a magnetic medium, a flash memory, other permanent, fixed, volatile or non-volatile memory. Examples of memory include one or more separate storage devices collocated or disbursed, capable of storing data structures, instructions, or any other data. Memory may further include a memory portion including instructions for the processor to execute. Memory may also be used as a working memory device for the processors or as a temporary storage.

Some embodiments may involve at least one processor. A processor may be any physical device or group of devices having electric circuitry that performs a logic operation on input or inputs. For example, at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, processors may be separate circuits or integrated in a single circuit. When more than one processor is used, the processors may be configured to operate independently or collaboratively. Processors may be coupled electrically, magnetically, optically, acoustically, mechanically or by other means that permit them to interact.

Consistent with the present disclosure, some embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public, wired network and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

In some embodiments, machine learning algorithms may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some embodiments, the hyper-parameters are set according to the training examples and the validation examples, and the parameters are set according to the training examples and the selected hyper-parameters. The machine learning algorithms may be further retrained based on any output.

Certain embodiments disclosed herein may include computer-implemented systems and methods for performing operations or methods comprising a series of steps. The computer-implemented systems and methods may be implemented by one or more computing devices, which may include one or more processors as described herein. The computing device may be one or more computers or any other devices capable of processing data. Such computing devices may include a display such as an LED display, augmented reality (AR), or virtual reality (VR) display. However, the computing device may also be implemented in a computing system that includes a back end component (e.g., as a data server), or that includes a middleware component (e.g., an application server), or that includes a front end component (e.g., a user device having a graphical user interface or a Web browser through which a user may interact with an embodiment of the systems and techniques described here), or any combination of such back end, middleware, or front end components. The components of the system and/or the computing device may be interconnected by any form or medium of digital data communication (e.g., a communication network). Examples of communication networks include a local area network ("LAN"), a wide area network ("WAN"), and the Internet. The computing device may include clients and servers. A client and server may be remote from each other and may interact through a communication network. The relationship of client and server arises by virtue of computer programs running on the respective computers and having a client-server relationship to each other.

Some embodiments of the present disclosure may include systems, methods, and non-transitory computer-readable media for tracking user activity at one or more physical locations. User activity may be collected and reported by one or more different reporting devices. As further disclosed herein, the reporting devices may be interconnected and/or communicatively coupled to a data integration server or a collection of servers.

Systems and methods consistent with the present disclosure may be implemented for a wide range of applications, including where there is a need to support redemptions for different types of awards and award enhancements. Embodiments of the present disclosure also relate to systems and methods where an award enhancement option is activated by a user, and the user is validated before redeeming the activated award enhancement option. By way of example, an award enhancement option may be activated online by a user and associated with account data of the user. Award enhancement options may be configured by an administrator and vary over time. The awards and/or award enhancement options for the awards may be related to an on-property game (e.g., a casino game implemented with an EGM at a physical location), an online game (e.g., an online video game), or any combination of them. The awards and/or award enhancement options may also be related to any services or products besides games, either on-property or online. In some embodiments, one or more award management servers may be communicatively coupled to a data integration server and implemented to manage awards and each award enhancement option.

In some embodiments, there may be one or more award enhancement options for an award. Further, an award enhancement option may be activated by a user in various ways. For example, a user may go to an online platform (e.g., a gaming website) and activate a specific award enhancement option by applying non-currency item(s) (e.g., membership or loyalty points, in-game credits or points, or the like). As another example, the user may also purchase the award enhancement option with currency. Once activated, the award enhancement option may be tagged or associated with the account data of the user. Before redemption, the user may be validated for their identity and whether the user is eligible to receive the award and award enhancement option. After validation is completed, the redemption may be performed in various ways, depending on the underlying award and the type of award enhancement option. These and other embodiments, features, and embodiments are further described herein.

As used herein, a "user" refers to an individual or group of individuals. Individuals may be associated with one another or organized into groups to perform a user activity. An "award," as used herein, refers to any physical or virtual gift, prize, promotion, reward, or any object conferred or bestowed to a user. Examples of rewards include a cash reward, a voucher reward, a point reward, or a discount reward. In some embodiments, an award may include a physical object. In some embodiments, an award may include cash or cash equivalents. The award may or may not be related to a game. For example, the award may be a winning prize conferred to a winner of a game (e.g., a casino game operated on an EGM or an online video game). As another example, the award may be a gift provided by a franchise to its customers. In another example, the award may be a promotion provided to customers. In some embodiments, the award may be time-gated or location dependent, in which its availability is limited to a certain period of time or redeemed at only certain location(s). It should be noted that the types and arrangements of awards are not limited to the examples described in this disclosure.

An "award enhancement option," as used herein, refers to an enhancement option (e.g., a perk, a prize multiplier, a top-up, or the like) to an award. There may be one or more available award enhancement options for each award. The award enhancement option may be a physical or virtual object. The award enhancement option may be selected and activated by a user and, once activated, tagged or associated with account data of the user. For example, a user may activate an award enhancement option by applying non-currency item(s) (e.g., customer loyalty points or points accumulated by playing an online or on-property game or performing other activities). As another example, the user may activate the award enhancement option by purchasing the award enhancement option using a currency (like $USD). In some embodiments, the redemption of the award enhancement option may require no condition or activity (i.e., it is instantly available upon activation). For example, if the award is a promotion for a 20% discount off hotel lodging, the award enhancement option may be is an extra 5% discount or a free item such as a beverage or breakfast with the hotel stay. In some embodiments, the award enhancement option may require one or more conditions or activities to be performed by the user in order for the award enhancement option to be eligible for redemption. For example, if the award is a winning prize for a particular casino game, the award enhancement option may be a multiplier of the winning prize with its redemption being conditioned on the user visiting the casino on Monday or Tuesday and winning the particular casino game. Additionally, or alternatively, other conditions or activities may apply to be eligible to redeem an award enhancement. For example, to be eligible to redeem a selected award enhancement option, the user may be required to achieve a certain score or result in a particular casino game or spend a certain amount of money at the casino.

An "activity," as used herein, refers to a defined user action or behavior. An activity may be performed virtually or online (e.g., via a website or a mobile application). An activity may be performed at one or more physical locations. A physical location may be defined geographically (e.g., by town, city, state, or country, or a predetermined radius around a location defined by latitude, longitude) or based on a location of an establishment or business (e.g., a casino or other gaming facility, a theatre or other entertainment facility, a hotel or other lodging facility, a food or beverage facility, or a retail store). An activity may be a single action or behavior and/or a set of actions or behaviors. An activity may be performed by a single individual or more than one individual. An activity may be an action performed by an individual or user interacting with an entity. For example, the activity may be making a transaction for goods or services with a particular business or entity. An activity may also be an action performed by a user or a user's device. For example, an activity may be a user or a user's device (e.g., a magnetic card, a contactless chip card, a mobile phone, or a tablet) being present at a physical location. An activity may also be a user interacting with a device at a physical location or completing an activity at a physical location. Other embodiments of activities will be apparent from this disclosure.

By way of example, an activity may be performing a specific action via augmented reality and virtual reality (AR/VR) devices. For example, in an electronic or online gaming environment, an activity may include performing a specific movement, pose, and/or any other action with one or more AR/VR devices. In a gaming environment, an activity may be an action or behavior performed by the user's role in the game. For example, a gaming activity may be completing or participating in a specific game. The gaming activity could also be achieving a specific number of wins or points in a game. The gaming activity could also relate to one or more specific achievements in a game, such as collecting certain item(s), discovering or eliminating certain target(s), or performing certain action(s) in the game.

"Points," as used herein, refer to a quantity or level of achievement, loyalty or other value associated with a user in a system or across multiple systems. Points may be earned or achieved through activities of a user (e.g., playing an online game, staying at a hotel, purchasing food or beverages, purchasing goods or services, etc.). Points may be redeemed or exchanged for discounts, rewards, coupons, gift cards, or other items. In some embodiments, points of a user may be redeemed or applied to activate a quest, as further disclosed herein. Points may also be earned by successfully completing a quest. Point information associated with a user (e.g., the total number of current points of a user and their point history, including exchanges or redemptions) may be recorded in a database or other memory in a system. In some embodiments, point information of a user may be associated with their profile or user account data stored in memory. Further, in some embodiments, point information may be accessed when a user is identified via a mobile phone application, a website login, and/or any other process through which their identity is validated. Additionally, or alternatively, point information from memory may be accessed when activity of that user is confirmed or reported in the system.

"Validation," as used herein, may refer to any operation or process of confirming, verifying, authenticating, or substantiating truthfulness of an individual or an object and/or their eligibility to redeem an award or award enhancement option. For example, validation of a user may include an operation of confirming an identity of the user. As another example, validation of an award or award enhancement option may include an operation of confirming whether the award or award enhancement option is activated, whether it is expired, whether it is associated with the user, whether required conditions or activities are met, or any combination thereof. In some embodiments, validation data may be generated by a reporting device or system for performing the validation. The validation data may be related to the award or award enhancement option, such as its availability and its associated user. For example, the validation data may be generated when an award or an award enhancement option is activated or upon the completion of required activities or conditions.

"Redemption," as used herein, may refer to any operation or process of converting an award or an award enhancement option into a defined virtual or physical object. In some embodiments, the redemption of an award or an award enhancement option may be validated and managed by an award management server. The award management server may match or synchronize activated award enhancement options with awards and determine when a user is qualified to redeem the award and/or the award enhancement option. For example, the award management server may determine when the conditions or criteria for an award have been satisfied and thus available for redemption. Similarly, the award management server may determine if the conditions or criteria (if any) for an award redemption option have been satisfied and whether the particular user that activated the award enhancement option is eligible to receive an award that is associated with award enhancement option. To synchronize the activated award enhancement options with the awards, the award management server may process and compare various data, including account data of the user as well as validation data, activation data, and activity data.

In some embodiments, validation data may be stored by a data integration server. The validation data may include first award data identifying an award. The data integration server may also store activation data obtained from a web server that hosts an online platform or website that enables a user to activate award enhancement options for awards. The activation data for an award enhancement option may include second award data identifying an award associated with the award enhancement option activated by the user. The activation data may be stored with account data of the user by the data integration server. In some embodiments, the award management server may be configured to query and process data stored by the data integration server. For example, the award management server may be configured to query and analyze validation data (including the first award data) and activation data (including the second award data). To determine if a user is qualified for an award enhancement option, the award management server may compare the first award data with the second award data. If there is a match between the first award data and second award data (i.e., the first award and the second award are the same award), then the user is determined to be qualified for the award enhancement option and the redemption thereof may be performed.

In some embodiments, the redemption of an award or award enhancement may be performed automatically by the award management server without human intervention. For example, the award management server may automatically post the award and/or award enhancement to the user account when all validation and redemption conditions are met. In some other embodiments, when a user is qualified for redemption, the redemption may be performed manually by an administrator. For example, the administrator may check the system and review the user account data to confirm the user is qualified for the redemption before completing the redemption (e.g., entering the award and/or award enhancement into the user account or handing out a physical prize, gift, voucher, or other item).

As noted above, systems and methods consistent with the present disclosure may be implemented for different applications. By way of example, embodiments of the present disclosure may be implemented for an enterprise or other entity that provides gaming services, entertainment services, lodging services, restaurants, and/or retail shopping. Awards and award enhancement options may be defined for users who visit or use any combination of these establishments or services. With the computerized embodiments of the present disclosure, user account data and data related to the redemption of award enhancements may be synchronized and managed with consistency and efficiency.

For purposes of illustration, embodiments of the present disclosure are described herein with reference to a gaming environment (e.g., an environment including online games and/or games played in-person at a casino or other gaming facility). It will be appreciated that the systems and methods of this disclosure may be implemented for other applications and activities, including those related to hotels, theatres, and other entertainment facilities, restaurants, and retail stores. Therefore, the examples herein are not limiting to the full scope and applications applicable to the systems and methods of this disclosure.

In a gaming environment, an online game may comprise any video game that is accessible partially or primarily via a network such as the Internet. An online game may be played by a single user and/or multiple users. An online game may be accessed via user's device (e.g., a mobile phone, tablet, wearable device, and/or any other computing device). An online game may also be a game conducted at a physical location with an online component. Games at a physical location such as a casino may also include physical games (like card games or roulette) as well as electronic games that require the physical presence of the user to play the game. Electronic games may be implemented with electronic gaming machines and require a wager or other form of payment to play the game. As used herein, the term "game" refers to all forms of games, including online games, physical games, and electronic games.

There are technical challenges with managing user account data and award redemptions across multiple platforms. Often, relevant data is not shared or synchronized for processing. Sharing data across multiple devices or platforms is also challenging due to disparate data formats or protocols and/or the lack of programming interfaces (such as APIs). Different sales, inventory, and/or customer resource management systems may also complicate the matter.

Embodiments of the present disclosure provide technical solutions for addressing the above challenges and enabling efficient management of user account data and award redemptions. In some embodiments, a computer-implemented system is provided for managing user account data and award redemptions. The system includes a web server, a data integration server, and an award management server. As disclosed herein, the web server may host an online platform or website that enables users to activate award enhancement options. The data integration server may process and store data provided from the web server, including activation data confirming award enhancement options activated by a user. The award management server may by communicatively coupled to and configured to query and analyze data stored in the data integration server to synchronize various types of date associated with a user's account across multiple devices and/or platforms, determine whether the user qualifies for an award and/or an award enhancement option for the award, and automatically process redemption of the award and/or award enhancement option if the user is qualified. There may also be one or more reporting devices that collect and post data to the data integration server, including activity data that confirms activities performed by a user. Embodiments of the present disclosure also include computer-implemented methods and computer readable media for performing the operations and steps related to the herein-disclosed systems.

FIG. 1 illustrates an example computing apparatus 100 for implementing systems and methods for managing user account data and award redemptions, consistent with embodiments of the present disclosure. As will be appreciated from this disclosure, computing apparatus 100 may be used to implement one or more components of the present disclosure, including a web server, a data integration server, an award management server, and reporting devices. Computing apparatus 100 and similar embodiments may also be used to implement end devices, such as user and administrator computing devices for connecting and interfacing with systems and websites consistent with the present disclosure.

As illustrated in FIG. 1, apparatus 100 includes a bus 102 and/or other communication components for communicating information and one or more hardware processor(s) 104 communicatively coupled with bus 102 for receiving and transmitting information. Processor(s) 104 may include, for example, a general-purpose microprocessor or central processing unit. Apparatus 100 also includes a main memory 106, such as a random access memory (RAM) or other dynamic storage devices, coupled to bus 102 for storing information and instructions to be executed by processor 104. Main memory 106 also may be used for storing temporary variables or other intermediate information during the execution of instructions to be executed by processor 104. Such instructions, when stored in non-transitory storage media accessible to processor 104, render computing apparatus 100 into a special-purpose machine that is customized to perform the operations specified in the instructions. computing apparatus 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

In some embodiments, computing apparatus 100 may be coupled via bus 102 to a display device 112, such as a cathode ray tube (CRT), liquid crystal display, or touch screen, for displaying information to a computer user. An input device 114, including alphanumeric and other keys, may also be coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device may have two degrees of freedom in two axes, a first axis (for example, x) and a second axis (for example, y), that allows the device to specify positions in a plane.

Computing apparatus 100 may implement disclosed embodiments using customized hard-wired logic, one or more ASICs or FPGAs, firmware, software and/or program logic, which in combination causes or programs computing apparatus 100 to be a special-purpose machine. In some embodiments, the operations, functionalities, and techniques disclosed herein are performed by computing apparatus 100 in response to processor 104 executing one or more sequences of one or more instructions included in main memory 106. Such instructions may be read into main memory 106 from another storage medium, such as storage device 110. Execution of the sequences of instructions included in main memory 106 causes processor 104 to perform process steps consistent with disclosed embodiments. In some embodiments, hard-wired circuitry of firmware may be used in place of or in combination with software instructions.

The term "storage media" may refer, but is not limited to, to any non-transitory media that stores data and/or instructions that cause a machine to operate in a specific fashion. Such storage media may comprise non-volatile media and/or volatile media. Non-volatile media includes, for example, optical or magnetic disks, such as storage device 110. Volatile media includes dynamic memory, such as main memory 106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 102. Transmission media may also take the form of acoustic or light waves, such as those generated during radio-wave and infrared data communications.

Various forms of media may be involved in carrying one or more sequences of one or more instructions to processor(s) 104 for execution. For example, the instructions may initially be carried on a magnetic disk or solid-state drive of a remote computer. The remote computer may load the instructions into its dynamic memory and send the instructions over a network line communication line using a modem, for example. A modem local to computing apparatus 100 may receive the data from the network communication line and may place the data on bus 102. Bus 102 carries the data to main memory 106, from which processor 104 retrieves and executes the instructions. The instructions received by main memory 106 may optionally be stored on storage device 110 either before or after execution by processor(s) 104.

Computing apparatus 100 also includes a communication interface 118 coupled to bus 102. Communication interface 118 provides a two-way data communication coupling to a network link 120 that is connected to a network, such as a local network or public network. For example, communication interface 118 may be an integrated services digital network (ISDN) card, cable modem, satellite modem, or a modem to provide a data communication connection to a corresponding type of telephone line or data network. As another example, communication interface 118 may be a local area network (LAN) card to provide a data communication connection to a compatible LAN. Communication interface 118 may also use wireless links (e.g., WiFi) and communicate to public networks such as the Internet. Communication interface 118 may send and receive electrical, electromagnetic, and/or optical signals that carry digital data streams representing various types of information.

Network link 120 may provide data communication through one or more networks. For example, network link 120 may provide a connection through a local network to other computing devices connected to the local network or to an external or public network, such as the Internet or other Wide Area Network. These networks use electrical, electromagnetic, and/or optical signals that carry digital data streams. The signals through the various networks and the signals on network link 120 and through communication interface 118, which carry the digital data to and from computing apparatus 100, are examples of forms of transmission media. Computing apparatus 100 may send messages and receive data, including program code, through the network(s), network link 120 and communication interface 118. In the Internet example, a server (not shown) may transmit requested code for an application program through the Internet (or Wide Area Network), the local network, and communication interface 118. The received code may be executed by processor 104 as it is received and/or stored in storage device 110 or other non-volatile storage for later execution.

Figure 2:
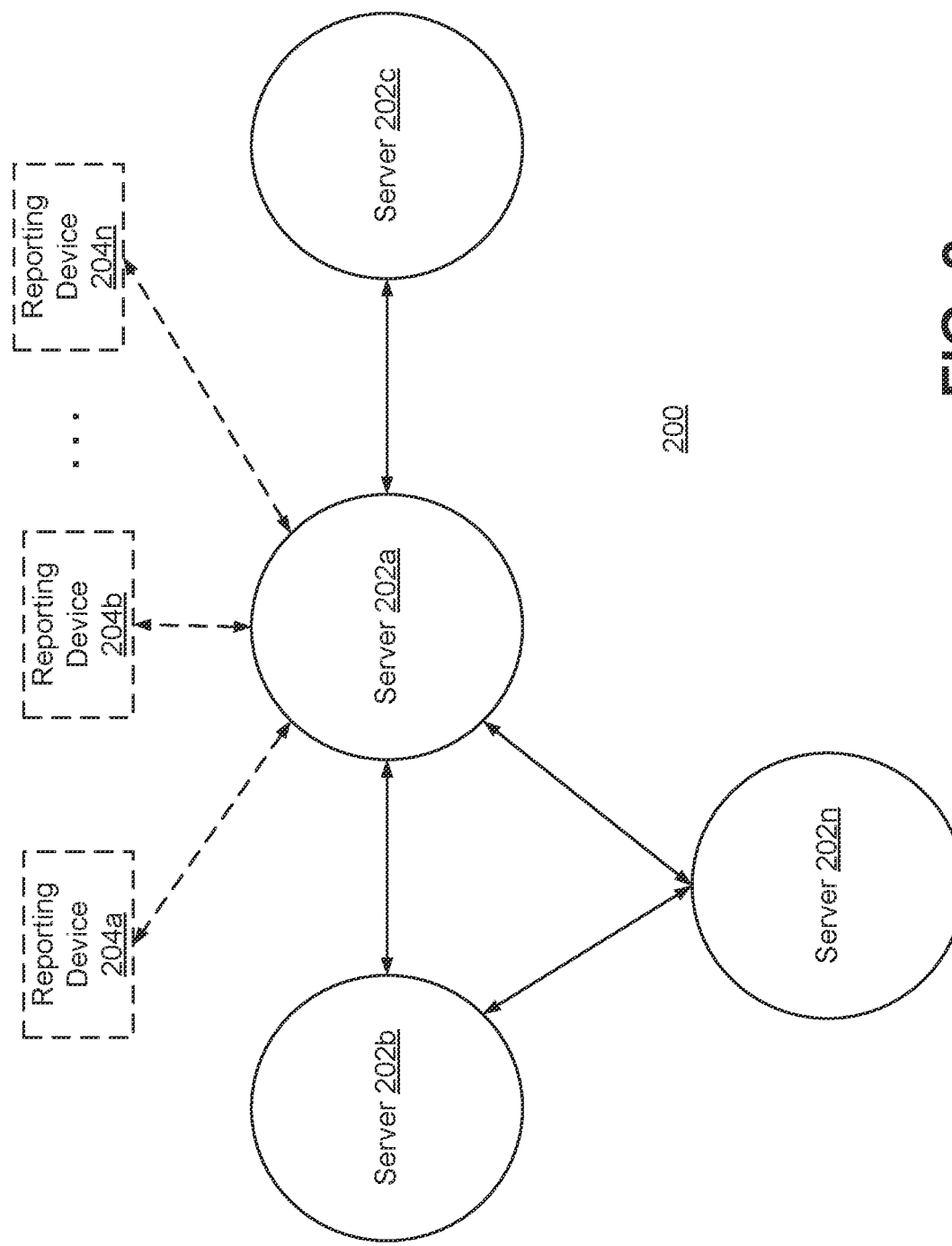
FIG. 2 illustrates an example arrangement of servers and reporting devices for implementing systems and methods for managing user account data and award redemptions, consistent with embodiments of this disclosure.

FIG. 2 illustrates an example system 200 for implementing systems and methods for managing user account data and award redemptions, consistent with embodiments of the present disclosure. As shown in FIG. 2, system 200 may include one or more servers. As will be appreciated, the number and arrangement of servers and other components in FIG. 2 is exemplary and does not limit the present disclosure. Each server may be implemented with a computing apparatus, such as apparatus 100 of FIG. 1. As an example, system 200 includes data integration server 202*a*, web server 202*b*, and award management server 202*c*. System 200 may further include other servers, including server 202*n*. The servers and other components (e.g., one or more reporting devices) may be communicatively coupled to one another using, for example, a communication network (such as a local network and/or the Internet) or direct communication links (wired or wireless links). For example, data integration server 202a may be communicatively coupled to web server 202b and award management server 202c. Server 202a, 202b, and 202n may be communicatively coupled to each other.

In some embodiments, optionally, system 200 may further include one or more reporting devices. For example, as illustrated in FIG. 2 with dash-line boxes and dash-line arrows, system 200 may optionally include one or more reporting devices 204a-204n. Reporting devices 204a-204n may be communicatively coupled to one or more servers, such as server 202a. Additionally, although not shown in FIG. 2, there may be one or more end devices, such as user and administrator computing apparatus (e.g., computers, laptops, tablets, smartphones, etc.) communicatively coupled to one or more servers via a network (e.g., a local area network and/or the Internet). It should be noted that the number and arrangement of these and the other components in FIG. 2 are exemplary and may be modified. Thus, other arrangements are possible, consistent with the present disclosure.

As shown in FIG. 2, the one or more reporting devices 204a-204n may be communicatively coupled to one or more of the servers (e.g., data integration server 202a and/or the other servers shown in the drawing). Each reporting device may be used for detecting users and tracking user activities that are related to awards and/or award enhancement options, including for confirming activity data for the redemption of awards and/or award enhancement options. As disclosed herein, in some embodiments, awards and award enhancement options may require the completion of certain conditions or activities by a user. Reporting devices 204a-204n may be configured to detect the identity of a user and the completion of activities by that user. Each reporting device may generate activity data (alone or together with user identity data) in response to the user performing one or more activities and transmit the activity data (alone or together with user identity data) to data integration server 202a for storage with account data of the user. In some embodiments, one or more reporting devices may also be configured to generate validation data confirming that the user is eligible for an award or award enhancement option.

Web server 202b may be communicatively coupled to data integration server 202a. Web server 202b may be configured to operate or host an online platform (e.g., a website) that enables users to log in with their credentials and activate an award enhancement option with credits, points, or a monetary payment. In response to a user logging into the online platform and activating an award enhancement option, web server 202b may generate user identity data. For example, web server 202b may transmit first identity data (e.g., data identifying a first user including a customer name and/or number or encrypted identification string) and activation data identifying the activated award enhancement option to data integration server 202a. In some embodiments, the first identity data may be generated in response to the user correctly logging into the online platform with their credentials (e.g., username and password) and the identity of the user being confirmed as a result of the login and/or a data lookup.

By way of example, data integration server 202a may receive first identity data that represents an identity of a first user from web server 202b. Data integration server 202a may also receive activation data identifying the award enhancement option activated by the first user from web server 202b. Data integration server 202a may be configured to format and store the user identity data and the activation data in a memory device (e.g., storage device 110 in FIG. 1). In some embodiments, data integration server 202a associates or stores the activation data with account data of the user. The associated account data of the user may be determined by data integration server 202a based on the first identity data of the user.

Award management server 202c may be communicatively coupled to data integration server 202a. Award management server 202c may be used to receive second identity data (e.g., from data integration server 202a or a reporting device) and validation data associated with the user (e.g., from data integration server 202a or a reporting device). The second identity data may include data representing an identity of the user, and the validation data may include information confirming that the user is eligible for redeeming an award or an award enhancement option. Further, award management server 202c may query data integration server 202a based on the second identity data and obtain the activation data associated with the account data of the user. Based on at least one of the validation data and the activation data, award management server 202c may determine the user qualifies to redeem an award or an award enhancement option for that award. Upon determining that the user qualifies for the award and/or award enhancement option for the award, award management server 202c may automatically update the account data of the user to include redemption data indicating that the user is authorized to receive the award or award enhancement option. In some embodiments, the account data of a user may be automatically updated with the redemption of the award or award redemption option (e.g., points, credits, a voucher, an enrollment, etc).

Server 202n may comprise one or more additional or supporting servers. For example, server 202n may include additional data integration servers, website servers, award management servers, or one or more supporting servers that facilitate the operations of data integration server 202a, web server 202b, and award management server 202c. The servers of FIG. 2 may be organized in clusters, regionally, or on the edge or approximate to predetermined locations.

As further shown in FIG. 2 and previously described above, system 200 may optionally include one or more reporting devices 204a to 204n. The reporting devices 204a to 204n are communicatively coupled to at least data integration server 202a. Each reporting device may be used to receive the second identity data representing the identity of the user (e.g., either online or at a physical location). A reporting device may then transmit the second identity data to data integration server 202a or award management server 202c. Further features and aspects related to reporting devices are described below and with reference to FIG. 3.

In some embodiments, web server 202b may be implemented with hardware (e.g., one or more computers) and/or software (e.g., one or more applications) to host and deliver web content that may be accessed by, for example, a user device (e.g., mobile device, laptop, computer) through a communication network, such as the internet. In some implementations, web server 202b includes one or more web servers. Each web server may host and operate a website. In some embodiments, web server(s) may deliver web pages relating to, for example, gaming applications or the like, to users. A web server may use, for example, a hypertext transfer protocol (HTTP/HTTPS or sHTTP) to communicate with a user device. The web pages delivered to a user device may include, for example, HTML documents, which may include images, style sheets, and scripts in addition to text content.

A user may operate, for example, a web browser, web crawler, or native mobile application, or other application and initiate communication by making a request for a specific resource using HTTP/HTTPS, and a web server (e.g., server 202b) may respond with the content of that resource or an error message if unable to do so. The resource may be, for example, a file stored on the backend of the web server 202b or a database related thereto. A web server also may enable or facilitate receiving content from a user device so a mobile device may be able to, for example, submit web forms, including uploading of files.

A web server may enable or facilitate executing a game from a user device. The game may be executed on an application and/or a website accessing from a user device. In one embodiment, for example, a web server may use any technology for presenting multimedia dynamic content, such as Hyper Text Markup Language 5 (HTML5), ADOBE-FLASH™, and any other software languages. In some embodiments, the game may be executed on multiple user devices. This may be achieved by executing applications on the user devices and/or through websites. By way of example, web server 202b may also support server-side scripting using, for example, Active Server Pages (ASP), PIP, or other scripting languages. Accordingly, the behavior of the server may be scripted in separate files while the actual server software remains unchanged.

Web server 202b may also enable or facilitate interaction with a user end device (not shown in FIG. 2) so that the user may be able to, for example, submit requests, including award enhancement option purchase or activation requests. An activation request may include information such as user identity data, data identifying a selected award enhancement option, purchase price, credit/point amount, credit card information, and/or other information to facilitate the activation request. As disclosed herein, users may use a virtual or non-currency item(s) (e.g., in-game points, credits, or the like) to purchase or activate award enhancement options.

In some embodiments, users may be allowed to activate one or more award enhancement options among different award types. Further, at any given time, there may be multiple users that have activated an award enhancement option. For example, there may be multiple users that have activated the same award enhancement option or there may be different award enhancement options that are active across different sets of users and underlying awards.

Configuration data may be defined and stored for each award and award enhancement option. In some embodiments, the configuration data may be defined by an administrator when setting up an award or award enhancement option using, for example, a graphical user interface hosted by award management server 202c or another server. The configuration data may be stored and used by award management server 202c to manage and determine the redemption of awards and award enhancement options. The configuration data may include, for example, a type of award or award enhancement option, a target amount, a type of game, a type of activity, location information, date and timing information (e.g., at least one of a start date and time, or an expiration date and time for an award or award enhancement option), and/or any other conditions or criteria.

In some embodiments, configuration data for an award enhancement option may include expiration data. The expiration data may be used to represent, for example, an expiration date and/or time for completing an award enhancement option. For example, award enhancement option A may have an expiration date of Jul. 1, 2021, at 12 noon. A user activating award enhancement option A would have from the time of activating the award enhancement option to the expiration date and/or time (i.e., Jul. 1, 2021, at 12 noon) to redeem the award enhancement option. In some embodiments, the expiration data may be different for different award enhancement options or users. The amount of time to redeem an award enhancement option may be set as a design parameter by an administrator and used to control the availability of an award enhancement option within the allotted time.

Data integration server 202a may perform various operations such as receiving and storing user data, activation data, and validation data from a variety of sources. For example, data may be collected from physical locations (casinos, hotels, restaurants, stores and so forth), websites, mobile applications, and social gaming and networking platforms (online platforms). This data may be provided to data integration server 202a over a communication network (e.g., the Internet) from each source. As previously noted, data integration server 202a may be communicatively coupled to one or more servers and/or reporting devices. By way of example, each website server and reporting device may send data directly to data integration server 202a via a communication network. This may allow data integration server 202a to receive the data in real time proximate to when it is created or available (e.g., when a user activity is performed or completed). In some embodiments, it may be preferable to provide data to data integration server 202a through indirect or batched communications. For example, one or more intermediate engines (not shown in FIG. 2) may be provided to compile data from a plurality of reporting devices at one or more physical locations and then send the data in batches periodically (e.g., hourly, daily, etc.) over a network to data integration server 202a. Such intermediate engine(s) may perform data translation and/or aggregation before the data is sent to the data integration server. This may elevate differences in data formats or protocols as well as make the ingestion of the data at the data integration server more efficient.

Data integration server 202a may process and compile data for storage and subsequent retrieval by other servers (e.g., award management server 202c). The data may be stored according to various structures, files, and formats as may be needed for processing. In some embodiments, the data related to a user may be stored in user account records. The data in the user account records may be retrieved and processed for various applications, including to track user activity and to manage user account data and award redemptions. As will be appreciated, user account data may also be used for other applications like sales promotion, marketing, and loyalty programs.

In some embodiments, a user account record may include a collection of data related to a user. For example, when the user identity data from a server or reporting device is received, data integration server 202a may verify the identity of the user. Based on the identified user, data integration server 202a may locate the user's account record and store the user identity data in that record. Further, the data integration server may also associate the user identity data with activation data identifying the award enhancement option activated by the user. For example, upon receiving the user identity data from a reporting device, data integration server 202a may verify the identity of the user based on the user identity data and associate the activation data with the user identity data and store the data in the user's account record. All data may be stored in a database associated with data integration server 202a.

Figure 3:
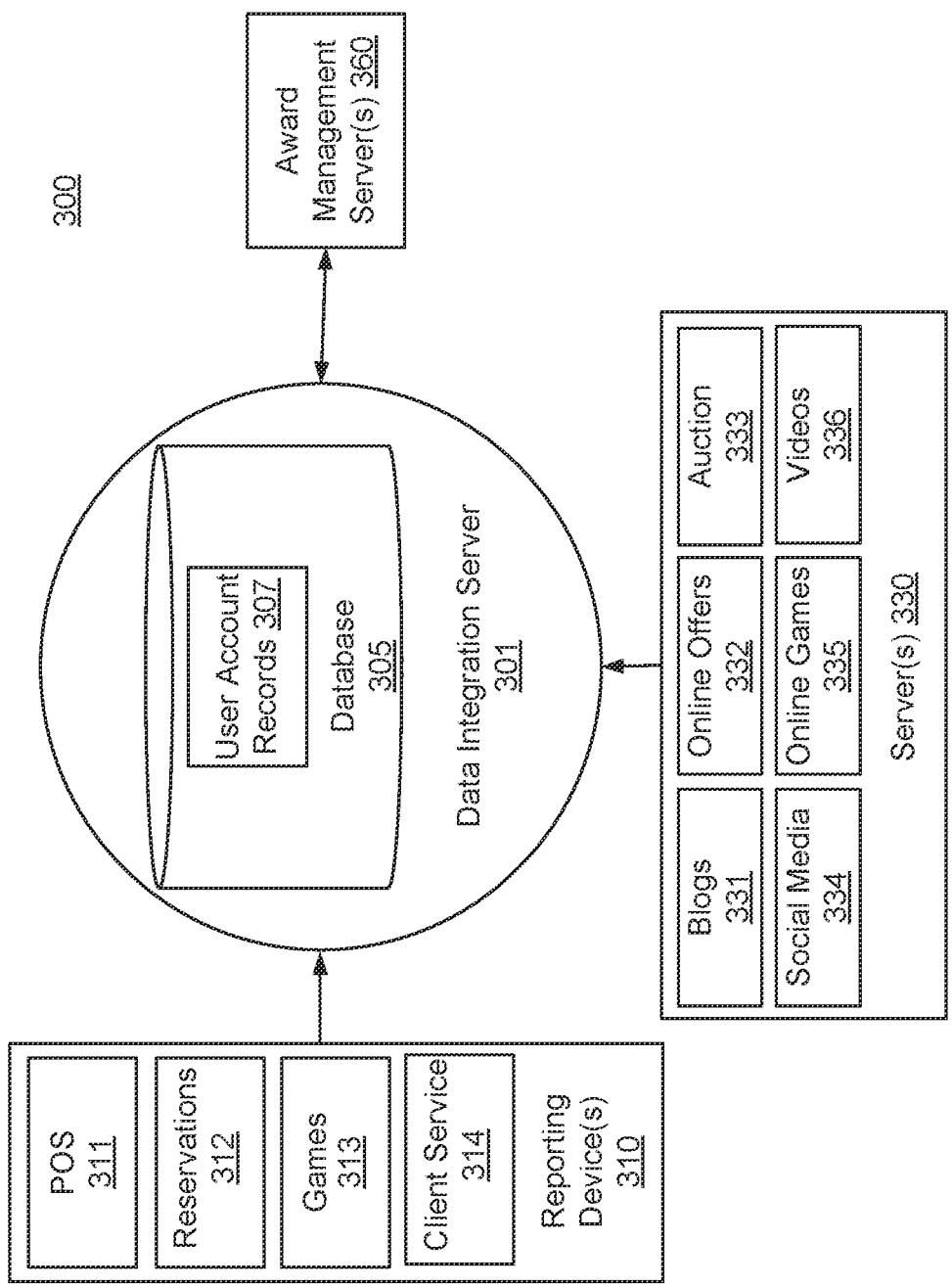
FIG. 3 illustrates an example computing system for managing user account data and award redemptions, consistent with embodiments of this disclosure.

FIG. 3 illustrates an example computing system 300 for managing user account data and award redemptions, consistent with embodiments of the present disclosure. Each of the components of FIG. 3 may be implemented with a computing apparatus, such as apparatus 100 of FIG. 1. As shown in FIG. 3, data integration server 301 communicates with one or more server(s) 330 and at least one award management server(s) 360. Further, data integration server 301 may optionally communicate with one or more reporting device(s) 310. In some embodiments, one or more local and/or wide area networks and/or one or more packet-based and/or public networks, such as the Internet, support the communication between the servers and components shown in FIG. 3. Further, conventional networking protocols and techniques may be used to support the communications between the components and servers of system 300.

In some embodiments, data integration server 301 includes one or more database(s) 305. Database(s) 305 may be implemented as an efficient data store for data that has been transmitted and received from the various components of FIG. 3, such as server(s) 330 and award management server(s) 360, as well as, optionally, reporting device(s) 310. Further, data integration server 301 and database 305 may be implemented to respond to queries from award management server(s) 360 and provide requested data, including stored data related to users including activation data and validation data. In some embodiments, database 305 is configured to store data related to a plurality of user account records 307.

User account records 307, as described above, may include data related to users. The data in a user's account record may include identity data of a user, account data of the user, activation data identifying award enhancement options activated by the user, and/or validation data confirming the awards that that the user is eligible to redeem. Other data that may be stored in a user's account record include, for example, purchase/award history, gaming history, points balance, and demographic and/or geographic attributes. The user account records 307 may also include data related to online activity of users, such as online gaming and account history.

Data integration server 301 processes and integrates data from multiple sources, such as server(s) 330 and optionally reporting device(s) 310. In some embodiments, the data from these sources may require translation or configuration before being stored in database 305. To accomplish this, data integration server 301 may include or utilize one or more data collection engines (not shown in FIG. 3). Data collection engines may be implemented and communicatively coupled internally or externally to data integration server 301. Any combination of hardware, software, and firmware may be used to implement the data collection engines. In some embodiments, data collection engines are implemented using the example computing apparatus of FIG. 1.

Data collection engines, in some embodiments, may perform functions to translate data from an original data format or protocol into a common or destination data format or protocol that may be imported into database 305. For example, each data collection engine may include one or more scripts that parse incoming data, extract data from it, and generate an insert statement for adding data to database 305. In addition, each data collection engine may collect data in real time from reporting device(s) 310 and translate the data before providing it to data integration server 301. In some embodiments, the data collection engines may be configured to operate under an ETL (extract transform load) paradigm or another suitable data extraction and transformation regime, depending on the implementation and needs of the system.

As further illustrated in FIG. 3 system 300 may optionally include reporting device(s) 310 that are communicatively coupled to data integration server 301. Reporting device(s) 310 may collect and provide data, including user identity data and activity data. In some embodiments, reporting device(s) 310 may also provide validation data for an award or award enhancement option. Reporting device(s) 310 may include, for example, computing devices related to various products and services, such as those related to the hospitality, retail, and gaming industries. The data collected and generated by reporting device(s) 310 may be transmitted and stored in data integration server 301. By way of example, reporting device(s) 310 may include one or more point of sale (POS) terminals 311, one or more reservation systems 312, one or more gaming systems 313 (such as EGMs), and one or more client service systems 314. As will be appreciated from this disclosure, other types of reporting device(s) may be included in system 300.

Server(s) 330 may execute and support, for example, websites and corresponding webpages for various products and services, such as online gaming sites, reservation systems, e-commerce businesses, and award or loyalty programs. An online platform or website may also be hosted by server(s) 330 to all award enhancement options to be selected and activated by users. Data collected and generated by server(s) 330 may be transmitted and stored in data integration server 301. Examples of data provided by server(s) 330 include user identity data and activation data. By way of example, server(s) 330 include one or more blogs 331, online offers 332, auctions 333, social media 334, online games 335, and videos 336. The data associated with each of these components may be transmitted and stored in data integration server 301 (e.g., as part of user account records 307).

While FIG. 3 depicts one or more components as external to data integration server 301, in some embodiments, such components may be included as part of data integration server 301. That is, embodiments of data integration server 301 are not limited to the components and configuration disclosed in FIG. 3. For example, in some embodiments, one or more reporting device(s) 310 may be part of data integration server 301 or data integration server 301 and award management server(s) 360 may be combined in whole or part. In addition, other components may be communicatively coupled with the servers and other apparatus shown in FIG. 3. For example, although not shown in FIG. 3, there may be one or more end devices, such as user and administrator computing apparatus (e.g., computers, laptops, tablets, smartphones, etc.) communicatively coupled to servers 330 and/or 360 via a network (e.g., a local area network and/or the Internet) to submit requests and access services and/or information. Thus, the network architecture and arrangement of system 300 of FIG. 3 is shown as just one example and does not limit the scope of the claims.

In some embodiments, server(s) 330 may operate and host one or more online platforms or websites that enables a plurality of users to play one or more online games (e.g., online games 335) and obtain non-currency item(s) (e.g., in-game winning points, credits or scores) to activate award enhancement options. In some embodiments, separate websites or webpages may be provided for online games 335 as opposed to the websites or webpages for selecting and activating award enhancement options. With an end device, a user may also be able to login and view their account data and award redemption status for awards and award enhancement options by websites or webpages hosted by server(s) 330. In some embodiments, one or more server(s) 330 (such as web servers) may generate one or more graphical user interfaces to display account data to a user after they log into their account with their end device. As noted, the account data may include redemption data indicating the award enhancement option(s) that the user is authorized to redeem. Additionally, server(s) 330 or 360 may provide graphical user interfaces to allow an administrator to log-in with an end device and define, schedule, and/or administer awards and award enhancement options. In some embodiments, an administrator or authorized employee may log-in and confirm and allocate award redemptions based on user account records, consistent with the present disclosure.

Figure 4:
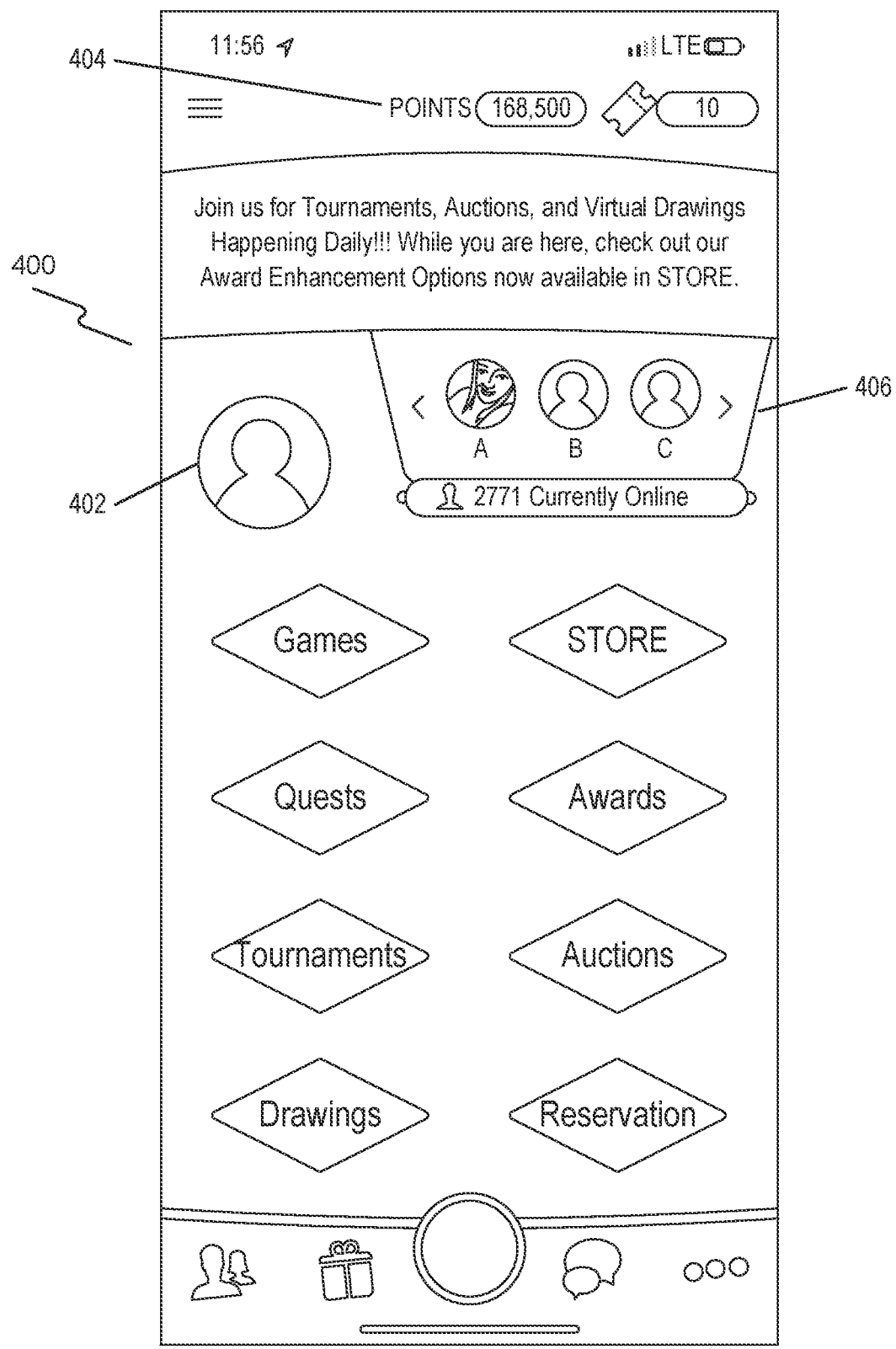
FIG. 4 illustrates an example graphical user interface for displaying information related to user account data, consistent with embodiments of this disclosure.

By way of example, FIG. 4 illustrates an example graphical user interface ("GUI") 400 for displaying information for a user 402 (represented by an avatar in GUI 400), consistent with embodiments of this disclosure. For example, GUI 400 may be displayed on a smartphone screen, a computer screen, a tablet screen, or any screen of an end device used of user 402. GUI 400 (as well as each of the other GUIs hereinafter described with reference to FIGS. 5-10) may be generated by one or more servers of the system, such as server(s) 330 in FIG. 3. The GUI(s) may provide access to information and services based on user account data of a user or customer, such as user 402.

As illustrated in FIG. 4, GUI 400 displays points 404 obtained by the user. Points 303 may be, for example, loyalty or customer points and/or points accumulated by user 402 from playing online games, making purchases, receiving awards or promotions, or other activities. Points 303 may be retrieved or determined from the points data stored as part of the user account record of user 402. In some embodiments, points are available for redemption or making purchases (e.g., to purchase an award enhancement option or other items like an entry ticket to a tournament or quest).

As further shown in FIG. 4, GUI 400 may also display other information such as a user list component 406 showing other users currently online (e.g., friends or contacts of user 402 that are actively connected to the online platform). Component 406 may allow user 402 to identify other users and engage in communications with them (e.g., electronic chat or messaging). GUI 400 may further display various links (e.g., represented by diamond buttons in FIG. 4) that provide information and/or link to services available for user 402. By way of example, such links or buttons may include a "Games" button to access and play one or more online games, a "STORE" button to link to an online store to redeem points 404, a "Quests" link to enroll in one or more quests or game challenge activities, an "Awards" link for providing information on one or more awards available for activation or conferred to user 402, a "Tournaments" button for enabling user 402 to enroll in one or more game tournaments, an "Auctions" button to allows user 402 to access information on and participate in one or more auction events, a "Drawings" link to access and participate in a drawing event or promotion, and a "Reservation" button that allows user 402 to make one or more different types of reservations (e.g., a hotel stay, a restaurant reservation, a an entertainment event, and so on).

Figure 5:
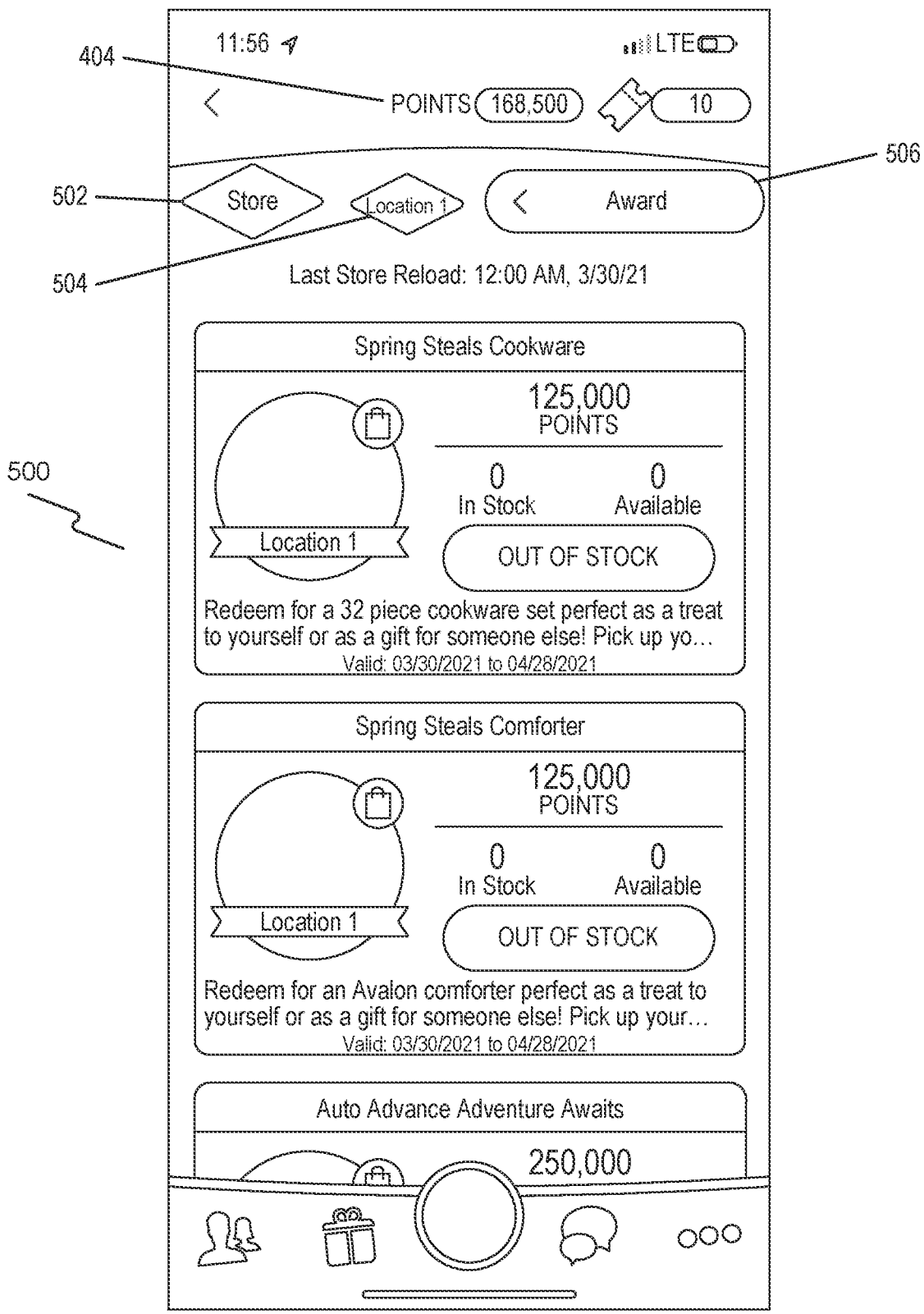
FIG. 5 illustrates an example graphical user interface for displaying information related to a store location for redeeming points, consistent with embodiments of this disclosure.

By way of example, FIG. 5 illustrates an example GUI 500 for displaying information related to an online store for redeeming points, consistent with embodiments of this disclosure. For example, GUI 500 may be displayed on a smartphone screen, a computer screen, a tablet screen, or any screen of an end device of user 402. In an example, GUI 500 may be displayed in response to clicking the "STORE" button in GUI 400 of FIG. 4. In this example, the online store is displayed for a particular location (e.g., "Location 1"). There may be one or more online store "locations" and optionally they may be associated with physical stores or locations (such as a hotel, restaurant, casino, resort, or the like). Further, through a button or link (e.g., 504), GUI 500 may allow user 402 to navigator to other locations, such as through a drop-down menu or list providing all available locations for selection and online navigation.

As illustrated in FIG. 5, GUI 500 displays points 404 (e.g., loyalty or customer points) of user 402 that are available for redemption or use. GUI 500 displays a number of buttons or links, such as a first button 502 (i.e., "STORE"), a second button 504 (i.e., "Location 1"), and a third button 506 (i.e., "Award"). First button 502 may allow user 402 to toggle or navigate (e.g., by clicking on the button) between a main display (like GUI 400 in FIG. 4) and an online store display (like GUI 500 of FIG. 5). Second button 504 may display the current location (e.g., "Location 1") to user 402 and allow navigation to other online store locations, such as by clicking on button 504 and selecting another location via a drop-down menu or list (not shown). Each location associated with the online store may have different promotion, awards, and/or other items, including award enhancement options. Some promotions or awards may involve activities or redemptions that are only available at a location, such as "Location 1." Some locations may or may not have specific awards or award enhancement options available at any given time. In other words, the award and/or award enhancement option may only be available with respect to one or more specific location(s) and for a specific time (e.g., over a validity period or through an expiration date). As previously noted, each location may correspond to a physical location or place (e.g., a retail store, restaurant, hotel, casino, resort, or the like). In some embodiments, the criteria or conditions for an award or award enhancement option may depend on the completion of one or more activities at a physical location. Further, in some embodiments, the redemption of the award or award redemption option may be performed manually at a physical location.

Referring again to FIG. 5, third button 506 may confirm to user 402 that he/she is viewing the "Award" page and/or provide functions related to awards. For example, clicking on button 506 may reload the awards page for the selected online store location (e.g., "Location 1"). As a further example, hovering over or double-clicking button 506 may provide an award menu option and/or allow navigation to other pages, such as an awards history page for user 402 or a list of award enhancement options for a store location such as Location 1. As part GUI 500, information regarding available promotions or awards may be displayed. If any award enhancement option is also available, they can also be shown or navigated to by user 402, as discussed above (see also FIG. 6). Specific information including the conditions for promotions or awards may be displayed in GUI 500, as well as whether they are active or out of stock. Links may also be provided to activate or redeem available promotions or awards. By way of example, FIG. 5 illustrates information blocks (e.g., represented by rectangular elements) for awards associated with Location 1, including an award titled "Spring Steals Cookware" (e.g., a cookware set), an award titled "Spring Steals Comforter" (e.g., a comforter), and an award titled "Auto Advance Adventure Awaits." For each award, GUI 500 displays a points value (e.g., "125,000 POINTS") needed to redeem the corresponding award or prize. Other information is also provided, including a description of the award or prize, a validity period or expiration date, how to receive the award or prize, and one or more availability status indicators (e.g., "OUT OF STOCK," "0 In Stock," or "0 Available"). As will be appreciated, the information block for each award may include any combination of text and graphics (e.g., a brief description and sample graphic for the prize) as well as one or more links.

Figure 6:
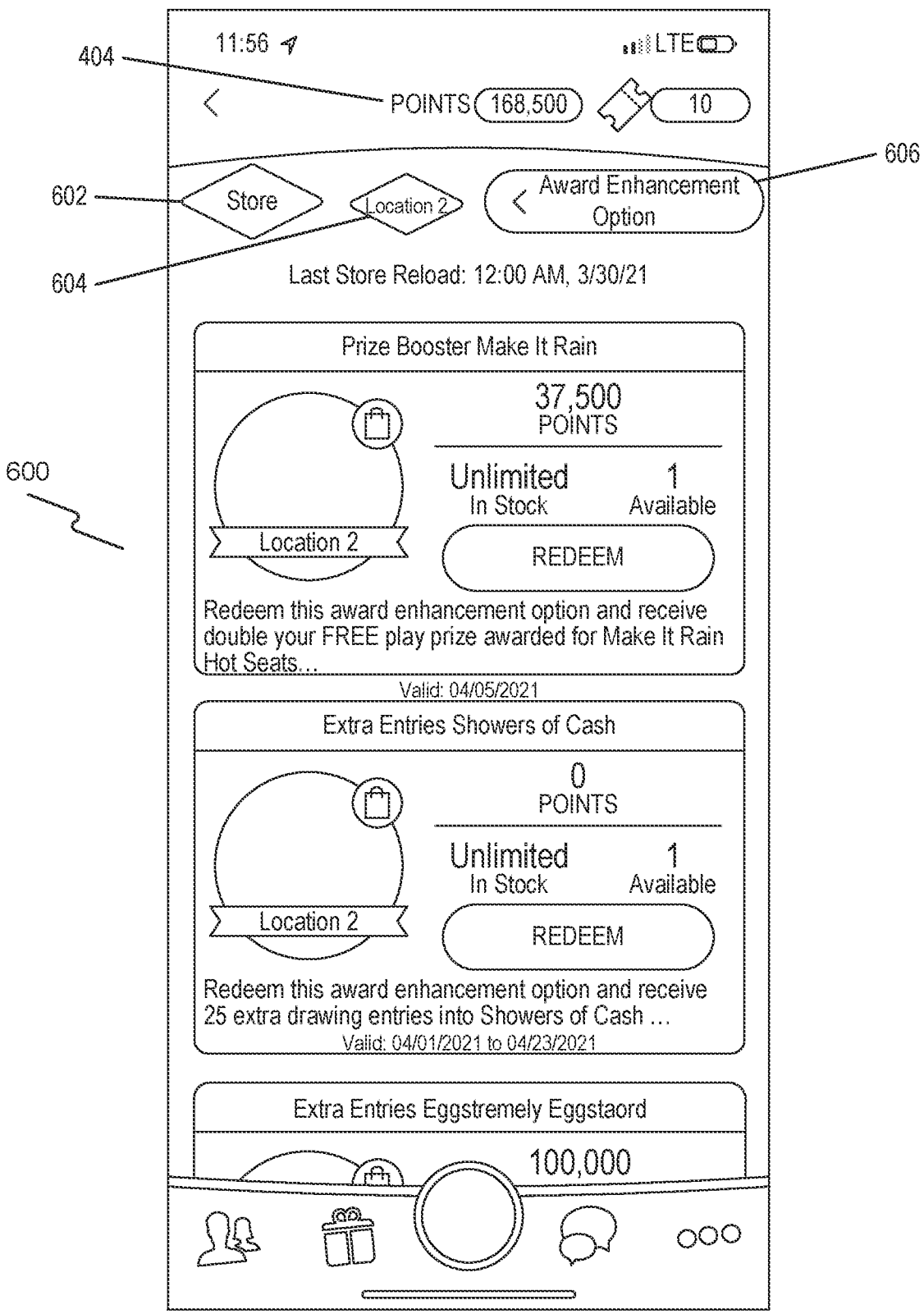
FIG. 6 illustrates an example graphical user interface for displaying information related to another store location for redeeming points, consistent with embodiments of this disclosure.

By way of example, FIG. 6 illustrates an example GUI 600 for displaying information related to another online store location ("Location 2") for redeeming points, consistent with embodiments of this disclosure. For example, GUI 600 may be displayed on a smartphone screen, a computer screen, a tablet screen, or any screen of an end device of user 402. In an example, GUI 600 may be displayed in response to clicking the link "STORE" in GUI 400 of FIG. 4 or updating the location link 504 (e.g., via a drop-down menu) to select "Location 2" in GUI 500 of FIG. 5.

As illustrated in FIG. 6, GUI 600 displays points 404 of user 402 that are available for redemption. Also, similar to GUI 500 of FIG. 5, GUI 600 displays a number of buttons or links, including first button 602 (i.e., "STORE"), a second button 604 (i.e., "Location 2"), and third button 606 (i.e., "Award Enhancement Option"). First button 602 may allow user 402 to toggle or navigate (e.g., by clicking on the button) between a main display (like GUI 400 in FIG. 4) and an online store display (like GUI 600 of FIG. 6). Second button 604 may display the current location (e.g., "Location 2" in the case of FIG. 6) to user 402 and allow navigation to other online store locations, such as by clicking on button 604 and selecting another location via a drop-down menu or list (not shown). As previously described, each location associated with the online store may have different promotion, awards, and/or other items, including award enhancement options, and may correspond to a physical location (e.g., a retail store, restaurant, hotel, casino, resort, or the like). Also, some promotions or awards may involve activities or redemptions that are only available at a location, such as "Location 2." Further, some locations may or may not have specific awards or award enhancement options available at any given time (e.g., they may be selectively scheduled by an administrator). In the example of FIG. 6, an award enhancement option is available, as indicated by third button 606.

In FIG. 6, third button 606 indicates to user 402 that one or more award enhancement options are available for redemption. Third button 606 may also provide functions and further information to user 402. For example, clicking on button 606 may reload or refresh the page for the selected store location (e.g., "Location 2"). As a further example, hovering over or double-clicking button 606 may provide an award menu option and/or allow navigation to other pages, such as an awards history page for user 402, including information on pending and redeemed award enhancement options. As part GUI 600, information regarding available promotions or awards may be displayed. In the illustrated example of GUI 600 for "Location 2," information regarding available award enhancement options is displayed for user 402. Specific information including a summary of and the conditions for each award enhancement option may be displayed in GUI 600, as well as whether they are active or out of stock. Links may also be provided to activate or redeem available award enhancement options. By way of example, FIG. 6 illustrates information blocks (e.g., represented by rectangular elements) for award enhancement options associated with Location 2, including award enhancement options titled "Prize Booster Make It Rain" (e.g., a winning award multiplier), "Extra Entries Showers of Cash" (e.g., an extra drawing entries for a prize named "Showers of Cash"), and "Extra Entries Eggstremely Eggstaord"). For each award enhancement option in GUI 600, a point value (e.g., "37,000 POINTS," "100,000 POINTS", or "0 POINTS") is displayed to indicate to user 402 the amount of points needed to activate and redeem the corresponding award enhancement option. In addition, one or more availability status indicators (e.g., "REDEEM," "Unlimited In Stock," or "1 Available") is displayed to indicate whether the award enhancement option is available or in stock to redeem. As will be appreciated, the information block for each award enhancement option may include any combination of text and graphics (e.g., a brief description and sample graphic) as well as one or more links.

Figure 7:
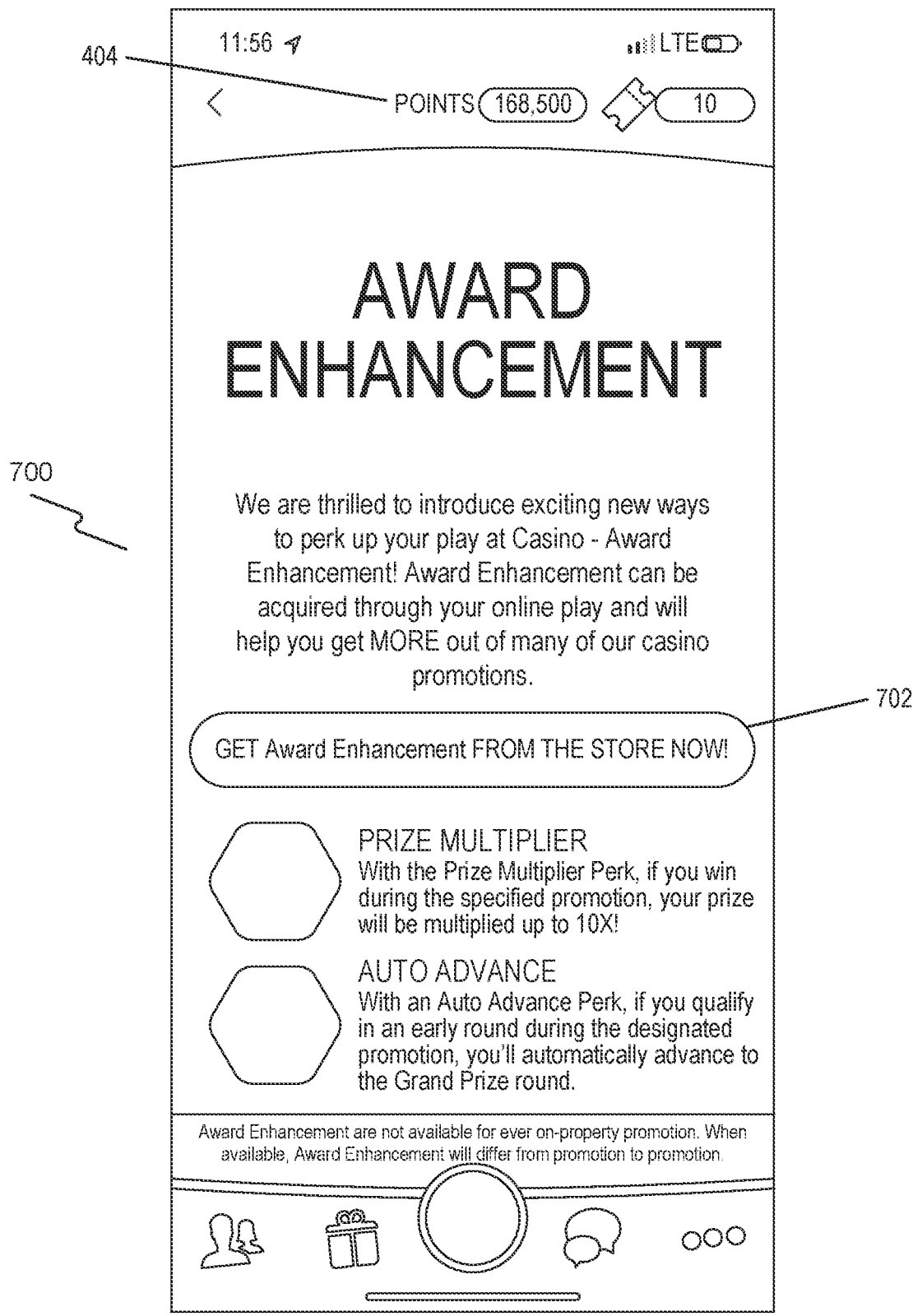
FIG. 7 illustrates an example graphical user interface for displaying information related to available award enhancement options, consistent with embodiments of this disclosure.

By way of example, FIG. 7 illustrates an example GUI 700 for displaying information related to available award enhancement options, consistent with embodiments of this disclosure. For example, GUI 700 may be displayed on a smartphone screen, a computer screen, a tablet screen, or any screen of an end device of user 402. In an example, GUI 700 may be displayed as an introduction page in response to user 402 logging into the online platform or clicking the "Award Enhancement Option" link 604 in GUI 600 of FIG. 6. As well be appreciated, GUI 700 may be accessed through other log-in sequences and links.

As illustrated in FIG. 7, GUI 700 also displays points 404 that are available for redemption for user 402. In addition, GUI 700 displays text introducing award enhancement options (e.g., "We are thrilled to . . . ") as well as graphics for explaining the different types of award enhancement options (e.g., "PRIZE MULTIPLIER" and "AUTO ADVANCE"). The example of FIG. 7 is a non-limiting embodiment, and any combination of text and graphics may be utilized. Further, one or more buttons or links may be provided in GUI 700. For example, GUI 700 includes a button 702 (i.e., "GET Award Enhancement FROM THE STORE NOW!"). By clicking button 702, user 402 may be linked to a store page for a location (such as GUI 500 or GUI 600). At any given time, the store page or GUI may display available award enhancement options, such as described above for in association with FIG. 6.

Figure 8:
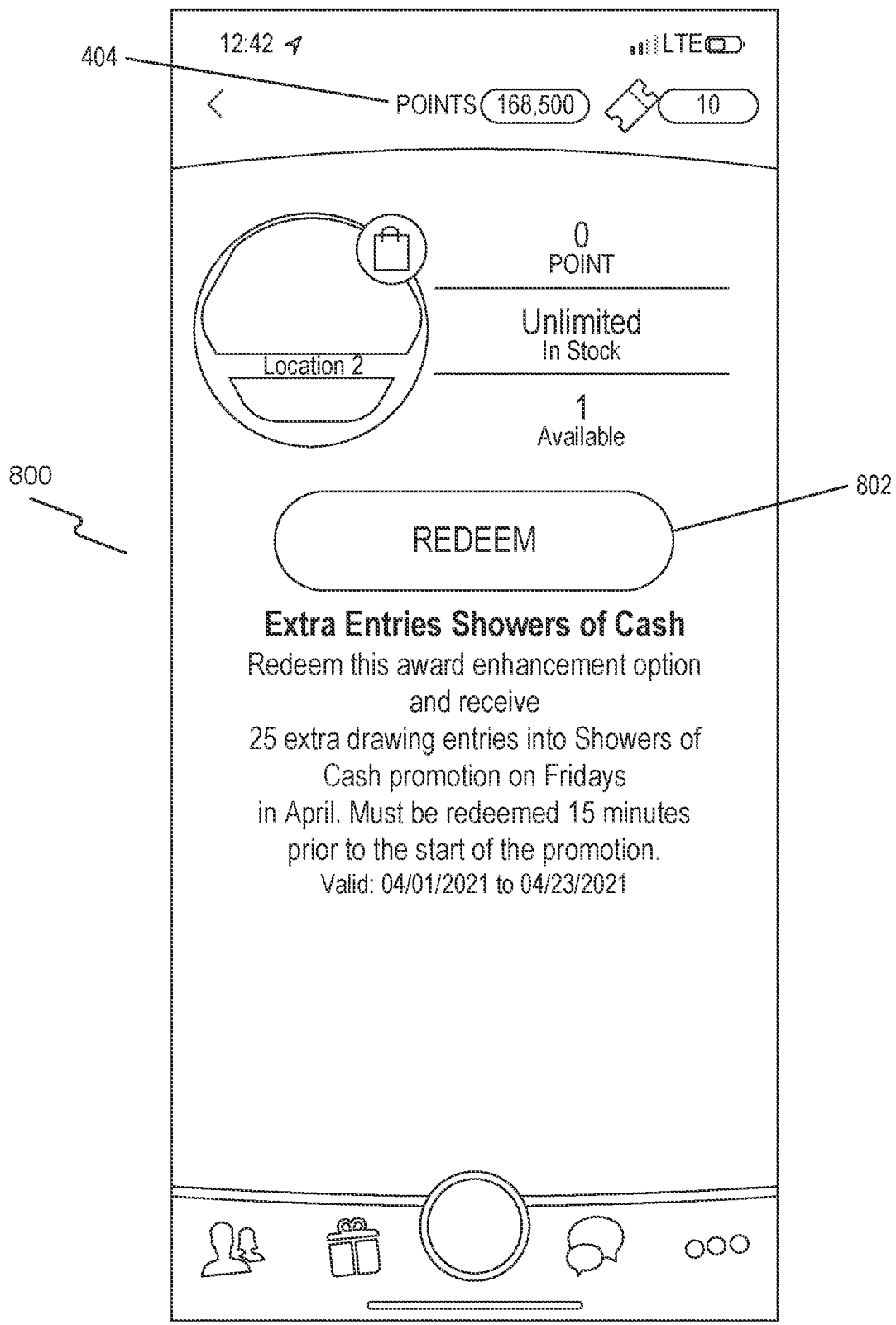
FIG. 8 illustrates another example graphical user interface for displaying information related to an award enhancement option, consistent with embodiments of this disclosure.

By way of example, FIG. 8 illustrates another example GUI 800 for displaying information related to an award enhancement option, consistent with embodiments of this disclosure. For example, GUI 800 may be displayed on a smartphone screen, a computer screen, a tablet screen, or any screen of an end device of user 402. In an example, GUI 800 may be displayed in response to clicking the "GET Award Enhancement FROM THE STORE NOW!" link 702 in GUI 700 of FIG. 7 or clicking a "REDEEM" link for an award enhancement option (e.g., "Extra Entries Showers of Cash") in GUI 600 of FIG. 6. As well be appreciated, GUI 700 may be accessed through other navigation sequences and links.

As illustrated in FIG. 8, GUI 800 also displays points 404 of user 402 that are available for redemption. However, as will be appreciated, GUI 800 may include any combination of text and graphics. In the example, GUI 800 displays a description of the award enhancement option (e.g., titled "Extra Entries Showers of Cash"), including what is offered (e.g., "Redeem this award enhancement option and receive 25 extra drawing entries . . . ") and the conditions related to the award enhancement option (e.g., "Must be redeemed 15 minutes prior to the start of the promotion."). The validity period or expiration date may also be presented (e.g., "Valid: 04/01/2021 to 4/23/2021), as well as the amount of points to activate or redeem the option (e.g., "0 POINT" or more) and relevant status and/or inventory information (e.g., "Unlimited In Stock" and "1 Available"). GUI 800 also displays a button or link 802 (i.e., "REDEEM") to optionally redeem or activate the award enhancement. If user 402 clicks button 802, the award enhancement option may be triggered to be redeemed and user 402 may be presented with an award enhancement activation page (see, e.g., FIG. 9).

Figure 9:
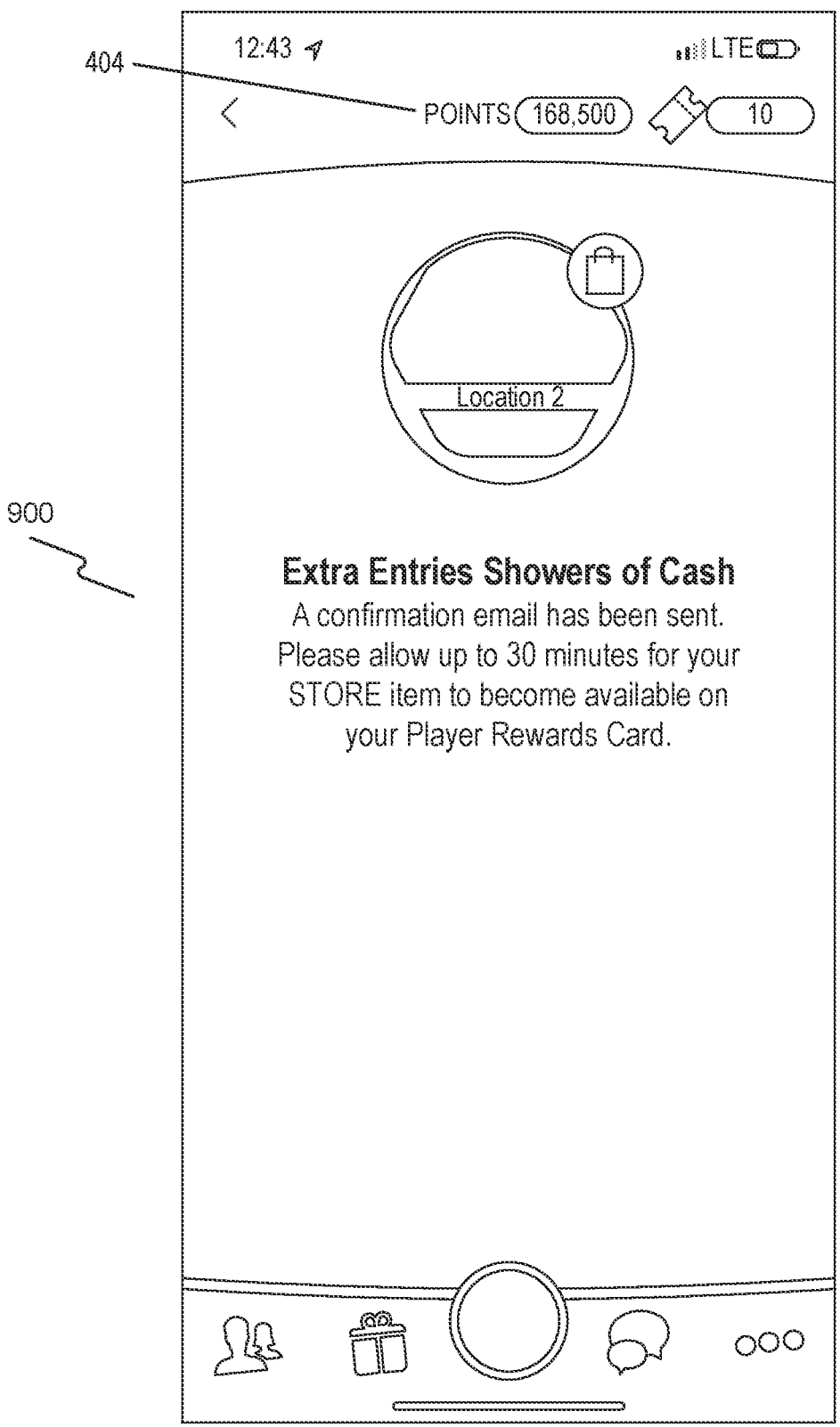
FIG. 9 illustrates another example graphical user interface for displaying information related to an activated award enhancement option, consistent with embodiments of this disclosure.

By way of example, FIG. 9 illustrates another example GUI 900 for displaying information related to an activated award enhancement option, consistent with embodiments of this disclosure. For example, GUI 900 may be displayed on a smartphone screen, a computer screen, a tablet screen, or any screen of an end device of user 402. In an example, GUI 900 may be displayed in response to clicking "REDEEM" button 802 in GUI 800 of FIG. 8. As well be appreciated, GUI 900 may be accessed through other navigation sequences and links.

As illustrated in FIG. 9, GUI 900 displays points 404 of user 402 that are available for redemption. As will be appreciated, GUI 800 may include any combination of text and graphics to provide confirmation of the activation of the award enhancement option. In the example, GUI 900 displays the title of the activated award enhancement option (e.g., "Extra Entries Showers of Case") and description of the confirmation process (e.g., "A confirmation email has been sent. Please allow up to 30 minutes for your STORE item to become available on your Player Rewards Card."). In some embodiments, a confirmation text or email may be sent to user 402. Additionally, or alternatively, user 402 may be able to see that the award enhancement option has been activated and tagged to their account by logging in and checking their account record date after a predetermined amount of time from activation (e.g., 10 minutes, 15 minutes, or more).

By way of example, FIG. 10 illustrates another example GUI 1000 for displaying information related to an activated award enhancement option, consistent with embodiments of this disclosure. For example, GUI 1000 may be displayed on a smartphone screen, a computer screen, a tablet screen, or any screen of an end device of user 402. In an example, GUI 1000 may be displayed in an interface of an email application, a message application, or the like. GUI 900 may be displayed in response to clicking "REDEEM" button 802 in GUI 800 of FIG. 8 and/or after user 402 views GUI 900 in FIG. 9. As well be appreciated, however, GUI 1000 may be viewed in response to any combination of navigation sequences and links.

GUI 1000 may include any combination of text and graphics to provide confirmation of the activation of the awards enhancement option, as well as links to enable user 402 to access information and functions (e.g., accessing an online game, accessing a prize or an award enhancement, performing one or more required activities, viewing progress towards completing all required activities, checking user account data, scheduling a manual redemption, and so on). In the example of FIG. 10, GUI 1000 displays a brief description (e.g., "Hi Joe, your STORE purchase is ready to be redeemed. Please see details below . . . ") for indicating to user 402 that the award enhancement option has been activated and any remaining conditions or steps needed to complete the redemption. The brief description may indicate user 402 a validity period for redeeming the award enhancement option (i.e., "VALID FROM: 04/01/2021 VALID TO: 04/23/2021"). GUI 1000 also displays a summary of points (e.g., "168,500") before and after the redemption in the account of user 402. GUI 1000 further displays a button 1002 (i.e., "PLAY NOW") that may link to a website or page for user 402 to use the redeemed award enhancement option.

It will be appreciated that GUIs 400-1000 and the accompanying figures and descriptions have been provided for illustration and that other graphical interfaces and pages may be implemented to display user account data, provide information regarding awards and award enhancement options, and enable users to activate and redeem awards and award enhancement options. Therefore, the present disclosure is not limited to the example embodiments described herein.

Figure 11:
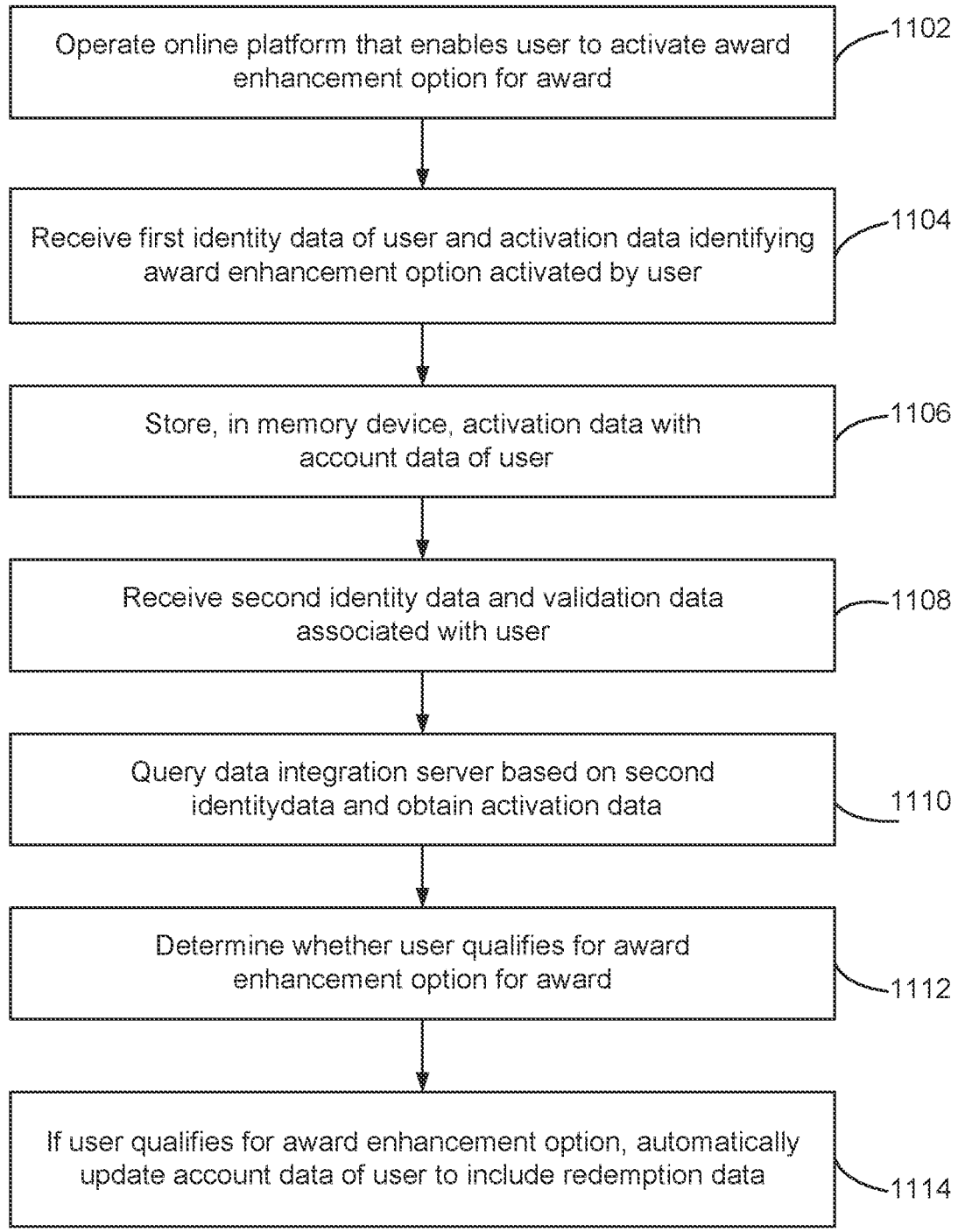
FIG. 11 is a flowchart of an example method for managing user account data and award redemptions, consistent with embodiments of this disclosure.

FIG. 11 is a flowchart illustrating an example method 1100 for managing user account data and award redemptions, consistent with embodiments of this disclosure. Method 1100 may be implemented with computing apparatus and systems, such as those disclosed herein (see, e.g., FIGS. 1-3). In some embodiments, method 1100 may be performed by at least one processor (e.g., processor 104 in FIG. 1) of a computer-implemented system, including at least one of a web server (e.g., one of server(s) 330 in FIG. 3), a data integration server (e.g., data integration server 301), and an award management server (e.g., award management server(s) 360). The respective steps and operations of these components for method 1100 are described below. It will be appreciated that the components and operations may be combined, modified, and/or rearranged depending on the application and system embodiment.

As illustrated in FIG. 11, at step 1102, an online platform may be operated (e.g., a website hosted by a web server) to enable a user to review available award enhancement options and select and activate an award enhancement option for an award. For example, one or more web servers such as server(s) 330 described in association with FIG. 3 may by implemented to host websites or webpages that enable users to review available award enhancements options and to select and activate an award enhancement option. In some embodiments, a reporting device (e.g., one or more reporting devices 310 of FIG. 3) such as an EGM or kiosk may enable a user to activate an award enhancement option and the reporting device may transmit the first identity data and activation data to the data integration server. As disclosed herein, activation may be performed by a user purchasing or redeeming points for the award enhancement option. In some embodiments, an award enhancement option may have one or more conditions or criteria that must be met before the award enhancement option can be redeemed. Further, as disclosed herein, award enhancement options may be limited in time and/or by location (e.g., a casino property or other physical location).

At step 1104, first identity data representing an identity of the user and activation data identifying the award enhancement option activated by the user may be received from the web server or other device (e.g., a reporting device like an EGM or kiosk). For example, the first identity data and activation data may be transmitted by the web server or other device to a data integration server communicatively coupled to the web server. The first identity data and activation data may be transmitted via local area network and/or the Internet using one or more data packets. In some embodiments, the first identity data and activation data are transmitted as part of the same transmission (e.g., via a data string, set of packets, file, or other data format). By way of example, the data integration server may be data integration server 301 described above in association with FIG. 3.

At step 1106, the activation data may be stored with account data of the user in a memory device. For example, the memory device may be storage device 110 described in association with FIG. 1. Additionally, or alternatively, the memory device may be a storage device or database of the data integration server. In some embodiments, the data integration server parses data received from the server(s) (e.g., a web server) and uses the first identity data to identify an account record of the user and then stores the activation data with the account data of the user. As disclosed herein, a data collection engine may be utilized to parse data transmitted from various servers, devices, and locations.

At step 1108, second identity data and validation data associated with the user may be received. For example, an award management server communicatively coupled to the data integration server may receive and analyze the second identity data and validation data. The second identity data may include data representing an identity of the user. The validation data may confirm that the user is eligible for the award. By way of example, the award management server may be implemented by one or more server(s) 360 described in association with FIG. 3.

In some embodiments, the validation data may be stored by the data integration server and the second identity data may be used to identify an account record of the user. The second identity data and validation data may be generated by various devices, such as a reporting device (e.g., a reporting device 310 of FIG. 3) and communicated to the data integration server. The award management server may receive the second identity data and validation data as a result of querying the data integration server (e.g., a periodic query request for validation updates from the data integration server). Alternatively, the data integration server may send the second identity data and validation data as part of reports or alerts to the award management server (e.g., an instantaneous or periodic report of new validation data that is pushed to the award management server).

Referring again FIG. 11, at step 1110, the data integration server may be queried by the award management server based on the second identity data that identifies the user. In response to the query, the data integration server may identify the account record of the user and send account data (e.g., the activation data and other data) to the award management server. Thus, the award management server may receive the activation data associated with the account data of the user. The award management server may also receive other data from the account record of the user in response to the query, such as user data, location data, status data, and so on.

At step 1112, the award management server may determine whether the user qualifies for the award enhancement option for the award based on at least one of the validation data and the activation data. In some embodiments, the award may be a first award, and the validation data may include first award data identifying the first award. In some embodiments, the activation data for the award enhancement option may include second award data identifying a second award associated with the award enhancement option. To determine whether the user is qualified for the award enhancement option, as part of step 1112, the award management server may compare the first award data with the second award data. In some embodiments, the user is determined by the award management server to be qualified for the award enhancement option when the first award and the second award are the same award. Additionally, or alternatively, award management server may confirm from user data from the data integration server whether the user is qualified to receive the award associated with the award enhancement option and apply that as a condition for determining the qualification of the user to receive the award enhancement option. For example, the user may not be qualified to receive the award enhancement option unless all conditions to receive the associated award have been met. Other conditions or criteria may be applied to qualify a user to receive the award enhancement option, such as the performance of one or more activities (e.g., visiting a casino property or other physical location on a specific day; playing a specific game on an EGM; achieving a predetermined achievement or result in a designated game; purchasing food or a specific item; and so on); the completion of all conditions within a time period or before an expiration date; requesting to redeem an award enhancement option at a particular location (if manual redemption is required); and so on.

At step 1114, when it is determined that the user qualifies for the award enhancement option, the account data of the user may be automatically updated (e.g., by the award management server) to include redemption data indicating that the user is authorized to receive the award enhancement option. In some embodiments, if an automatic redemption is permitted, the account data may be further updated (e.g., by an award management server) to include an award enhancement based on the award enhancement option. For example, the award enhancement may include data representing at least one of a credit, a voucher, a coupon, a discount, one or more points, an advancement, a multiplied award, a prize, a pass, a subscription, or an enrollment.

In some embodiments, reporting data may be generated by the award management server to report authorization of the award enhancement option to the user. The reporting data may be reported to the user by email or a text message. Additionally, or alternatively, the reporting data may be stored as part of the account data of the user. In some embodiments, the user is notified about the authorization status of the award enhancement option by viewing their account data via a webpage or graphical user interface. Also, as mentioned above, electronic notifications can be sent to the user via email or text message.

Consistent with some embodiments, method 1110 may further include generating (e.g., by at least one reporting device communicatively coupled to the data integration server) activity data in response to the user performing one or more activities. Method 1110 may further include storing (e.g., by a data integration server) the activity data with the account data of the user in a memory device or database. By way of example, the reporting device may include at least one of a gaming server, an electronic gaming machine (EGM), a security server, a smartphone, a point-of-sale device, a bar code reader, a magnetic card reader, a contactless chip detector, a biometric reader, a video camera, a geo-location detector, or a beacon reader. The one or more activities may include at least one of the user visiting a website, the user visiting a physical location (e.g., a casino property, a hotel, a restaurant, a theater, a retail store, and so on), the user staying at a physical location for a predetermined amount of time, the user playing an online game, the user playing a game at a physical location, or the user achieving a predetermined achievement or result in a designated game.

In some embodiments, method 1110 may further include validating with a reporting device the identity of the user and transmitting the second identity data with the activity data to the data integration server. In some embodiments, method 1110 may further include determining by the award management server whether the user qualifies for the award enhancement option for the award based on the activity data stored with the account data of the user.

Consistent with some embodiments, method 1110 may further include enabling the user to enroll, through an online platform or website, in a promotion to receive the award. Method 1110 may also include generating by a web server the validation data confirming that the user is eligible for the award associated with the promotion when the user enrolls in the promotion. In some embodiments, method 1110 may further include enabling the user to activate an award enhancement option by applying points obtained by the user by playing at least one online game.

Consistent with some embodiments, method 1110 may further include determining (e.g., by an award management server) whether a required activity for an award or an award enhancement option is performed by the user on or before a predetermined expiration date or within a validity period. When reporting a completed activity to the data integration server, the activity data may include the date on which the activity was completed. The activity data, including the completion data, may be analyzed to confirm that the required activity was performed by a predetermined expiration date or withing a validity period. Method 1100 may also include determining (e.g., by an award management server) that the user is qualified for an award or an award enhancement option when the required activity is determined to be performed on or before the predetermined expiration date or within a validity period.

Consistent with some embodiments, method 1110 may further include generating (e.g., by a web server) a graphical user interface to display account data of the user, including redemption data indicating that the user is authorized to receive an award enhancement option. Consistent with some embodiments, method 1110 may further include operating (e.g., by a web server) an online platform or website that enables a plurality of users to play one or more online games and obtain credits to activate award enhancement options.

By way of example, method 1100 and similar methods may be implemented by a computer-implemented system (e.g., system 200 or system 300 described herein). Consistent with some embodiments of this disclosure, with reference to FIGS. 2-11, the computer-implemented system may include one or more web servers (e.g., server(s) 330) that enable a user to select and enroll in an award enhancement option (e.g., by clicking a "REDEEM" button or link as shown in the example of FIGS. 6 and 8 and/or button or link 702 in FIG. 7) when visiting an online platform or website(s). After a user activates or enrolls in an award enhancement option, validation data may be generated to confirm that the user is eligible for the award and award enhancement option related to the award. In some embodiments, by analyzing the account data of the user, the award management server (e.g., server(s) 360) can confirm the user's eligibility and generate the validation data. Award management server(s) may also analyze historical data and preferences of each user from their account data to identify a behavior trend of the user. With such data, similar users may be grouped and offered specific promotions and award enhancement options that match their preferences and behavior. As a benefit, this may improve award management, user response rates, and engagement.

In some embodiments, one or more web servers (e.g., server(s) 330 of FIG. 3) may enable a user (e.g., user 402) to activate an award enhancement option (e.g., any of the award enhancement options described in association with FIGS. 6-10) by applying points (e.g., points 404 shown in FIGS. 4-9) obtained by the user by playing at least one online game (e.g., online games 335 hosted by server(s) 330 shown in FIG. 3) executed through the web server(s).

Consistent with some embodiments of this disclosure, the computer-implemented system for performing method 1100 may also include a data integration server (e.g., data integration server 301 described in association with FIG. 3) communicatively coupled to one or more servers (e.g., server(s) 330). As described with examples in step 1104, the data integration server may receive first identity data representing an identity of the user and activation data identifying the award enhancement option activated by the user. The data integration server may store, in a memory device (e.g., storage device 110 of FIG. 1), the activation data with the associated account data of the user that activated the award enhancement option. For example, the first identity data may include an alphanumerical data string (e.g., "U1004560 . . . ") and/or data representing one or more of a username, a customer name, number and/or group, a zip code, an area code, an email address, a username, a user code and/or other data to identify or lookup the identity of the user. In some embodiments, the first identity data encryption is used to send the first identity data and activation data. With respect to the activation data, it may include, for example, one or more of a flag, a field, an attribute, a code, a token, and/or any other data to identify or lookup the award enhancement option activated by the user.

Consistent with some embodiments of this disclosure, the computer-implemented system for performing method 1100 may further include an award management server (e.g., award management server(s) 360 as described in association with FIG. 3) communicatively coupled to the data integration server. As previously described, the award management server may receive the second identity data and validation data associated with the user. The second identity data may include data representing an identity of the user. The validation data may be used to confirm that the user is eligible for an award redemption. As described, the award management server may query the data integration server based on the second identity data and obtain the activation data associated with the account data of the user. Then, the award management server may determine, based on at least one of the validation data and the activation data, whether the user qualifies for the award enhancement option for the award. When it is determined that the user qualifies for the award enhancement option for the award, the award management server may automatically update the account data of the user to include redemption data (e.g., a flag, a field, an attribute, a database entry, and/or the like) indicating that the user is authorized to receive the award enhancement option.

By way of example, the account data for a user may be stored in a database according to data model or schema. For example, the database may include multiple data fields for keeping data, such as user data, activation data, validation data, and redemption data. The activation data may include data identifying the award enhancement option activated by the user. Relevant configuration data (e.g., an identification string, code, or token) for each award enhancement option (including defined conditions and award enhancement amount(s)) may be stored separately and/or accessible to the award management server (e.g., via a database lookup based on an identification string, code, or token for the award enhancement option). The validation data may include data verifying what conditions or criteria have been completed and/or the dates on which each condition or criteria was completed. Such data may be stored in related tables or fields with truth/false flags and/or values. For example, the redemption data may include a true/false flag (e.g., "0" representing false and "1" representing true) and/or other data to confirm whether the user is authorized to receive an award or award enhancement option. A true flag may represent that the user is authorized to receive the award or award enhancement option. A false flag may represent that the user is not authorized to receive the award or award enhancement option. As another example, the redemption data may be implemented as an enumeration value, which may represent a particular award or award enhancement option that is authorized for a user to receive. The enumeration value may be based on the configuration details for the award or award enhancement option. The enumeration value may also include a specific value representing that the user is not authorized to receive the award or award enhancement option. It should be noted that the association of the redemption data and other data to the account data of the user may be implemented in various ways and is not limited to the example embodiments described herein.

In some embodiments, based on the first identity data and the second identity data, the award management server may identify and validate the user. In some embodiments, identifying and validating the user may involve comparing the first identity data to the second identity data. When a match is recognized, the award management server may identify and validate the user. In some embodiments, the award management server may access a user account data stored in the data integration server for the first identity data and the second identity data.

By way of example, the second identity data may include an alphanumerical data string (e.g., "U1004560...") and/or data representing one or more of a username, a customer name, number and/or group, a zip code, an area code, an email address, a username, a user code and/or other data to identify or lookup the identity of the user. In some embodiments, the second identity data and the first identity data may be collected by different devices or at different geographic locations. For example, the first identity data (e.g., a username and a password) may be collected by a server that operates an online platform, and the second identity data (e.g., a customer name and/or number) may be collected by a reporting device (e.g., one or more of reporting device(s) 310 in FIG. 3). A match between the first identity data and second identity data may be resolved by the award management server through querying and analyzing the account data stored by the data integration server which links each form of identity data to the same user.

In some embodiments, an award that the user is eligible for may be a first award, and the validation data may include first award data identifying the first award. Further, the activation data for an award enhancement option may include second award data identifying a second award associated with the award enhancement option. In such embodiments, the award management server may determine whether the user is qualified for the award enhancement option by comparing the first award data with the second award data. The user may be determined to be qualified to redeem the award enhancement option when the first award and the second award are the same award.

By way of example, the first award data may be an award of winning a slot game operated at an EGM located in a casino, and the validation data may include the first award data identifying that the first user wins the slot game with a prize amount. The activation data may indicate that the user has activated an award enhancement option for a prize multiplier (e.g., for doubling the prize amount). The activation data may also include second award data identifying that if the award enhancement option is eligible for the user, the user may win a second award. In some cases, the second award may be the same as the first award (e.g., a winning user may claim the prize amount as indicated by the first award data and the extra prize amount doubled by the award enhancement option as indicated by the second award data). In some cases, the second award may be different as compared to the first award (e.g., a winning user may claim the prize amount as indicated by the first award data, the extra prize amount doubled by the award enhancement option, and another award as indicated by the second award data such as a free round of a next slot game).

In some embodiments, the award management server may further generate reporting data to report authorization of the award enhancement option to the user. By way of example, the reporting data may include descriptions such as that described above in association with FIGS. 9-10.

In some embodiments, the award management server may update the account data to include an award enhancement based on the award enhancement option. In some embodiments, the award enhancement may include data representing at least one of a credit, a voucher, a coupon, a discount, one or more points, an advancement, a multiplied award, a prize, a pass, a subscription, or an enrollment. By way of example, the award enhancement option may be an award enhancement such as the "Extra Entries Showers of Cash" described in association with FIGS. 8-10, in which the award enhancement is 25 extra drawing entries into the "Showers of Cash" promotion.

In some embodiments, the configuration data for an award enhancement option may define whether a required activity must be performed by the user on or before a predetermined expiration date or withing a validity period. When the required activity is determined to be performed on or before the expiration date or within a validity period, the award management server may determine that the user is qualified for the award enhancement option for the award. By way of example, the required activities may include at least one of playing a particular game online or onsite, spending up to a specified amount in the user's account, accumulating to a certain number of points, visiting a particular casino property on specific days or times, participating in a designated tournament, posting a social media post with a particular hashtag, staying at a particular hotel, and/or other activities.

Consistent with some embodiments of this disclosure, besides the web server(s), the data integration server, and the award management server as described herein, the computer-implemented system for performing method 1100 may further include one or more reporting devices (e.g., reporting device(s) 310 illustrated in FIG. 3) communicatively coupled to the data integration server. Each reporting device may generate activity data in response to the user performing one or more activities. The data integration server may further store, in the memory device, the activity data with the account data of the user. In some embodiments, the at least one reporting device may generate the second identity data described herein. Further, in some embodiments, the activity data is stored with the validation data.

In some embodiments, each reporting device may validate the identity of the user and transmit the second identity data with the activity data to the data integration server when the identity of the user is validated and the activity data is collected. By way of example, reporting device(s) may include a gaming server, a website server, an electronic gaming machine, a security server, a smartphone, a point of sale device, a bar code reader, a magnetic card reader, a contactless chip detector, a biometric reader, a video camera, a geo-location detector, and/or a beacon reader. Further examples of reporting devices include smartphones, laptops, wearable devices, tablets, and/or any personal electronic device.

By way of example, a reporting device may collect identity data, such as a user identifier and user device information (e.g., IP address, type and make information, etc.) to generate the second identity data. The second identity data may involve, for example, machine readable data (e.g., QR code, bar code, and/or any visual representation), biometric identification data (e.g., facial recognition identification, iris scan, fingerprint identification, etc.), location tracking data, indoor navigation data, and/or any other information to recognize the user. Users may be recognized by browser cookies, opening a mobile application, logging in to their accounts, inputting account numbers and passwords, and/or entering verification numbers.

In some embodiments, a plurality of reporting devices may be located at one or more physical locations. By way of example, in a casino or group of related casinos, a plurality of reporting devices may be implemented. For example, a membership card reader may be used in a lobby or certain gaming machine areas. Facial recognition devices may be implemented in kiosks or other parts of a building. If a casino provides food and beverage services and/or lodge services, POS terminals and/or magnetic card readers may be implemented where those services are rendered. In some embodiments, the plurality of reporting devices may include two or more of an electronic gaming machine, a point-of-sale device, a bar code reader, a magnetic card reader, a contactless chip detector, a biometric reader, a network video camera, a geo-location detector, and a beacon reader.

As disclosed herein, each reporting device may generate activity data associated with the user. The activity data may be monitored and communicated directly or indirectly to the data integration server in real-time or on a periodic basis. For example, a reporting device may access or generate the activity data through the application where the game is executed, game data reported from an EGM or gaming device, the website where the game is accessed, and/or program(s) running in the background when the device is on. The data may also be entered manually. Upon completion of certain activity, the user may enter information indicating that the activity is completed, or someone at the onsite business may enter such information. For example, after completing an activity, the users may access a code, and they may upload the code via the reporting devices.

As disclosed herein, points may be redeemable for awards or award enhancement options. In some embodiments, the award management server may calculate the points that the user has accrued and/or redeemed (i.e., manage the points balance of the user). For example, points may be awarded based on the number of transactions or value of the transactions between the user and a casino or other business entity. Portions or all of these points may expire after a certain time. Also, as disclosed, points may be redeemed for activating an award enhancement option. The award management server may monitor the points value for a certain user and send this information to the data integration server, which may store this data into a user's account record.

In some embodiments, the one or more activities performed by the user may include at least one of the user visiting a website, the user visiting a physical location, the user staying at a physical location for a predetermined amount of time, the user playing an online game, the user playing a game at a physical location, or the user achieving a predetermined achievement or result in a designated game.

In some embodiments, the award management server may further determine whether the user qualifies for the award enhancement option for the award based on the activity data stored with the account data of the user. For example, if the stored activity data indicates that the user has performed all required activities before an expiration date or within a validity period, the award management server may determine that the user qualifies for the award enhancement option. By way of example, the activity data may be recorded to include one or more activities that the user has started, the activities that the user has completed, the time when each activity was performed, the time when an activity was completed, the number of activities started or completed, and/or any other data related to a user's online or onsite behavior. The activity data may be monitored in real time or on a periodic basis.

In some embodiments, the activity data may include a user's gaming and/or other activity history. The user's gaming history may be monitored or calculated in a number of ways. For example, the gaming history may include the frequency at which the user plays or the amount of money the user spends on average. The gaming history may be monitored on a daily, quarterly, and/or annual basis. In another example, the user's gaming history may include the user's preferences for certain games or certain types of games and win-loss information that may factor into a user's decision to continue playing that game, move to a different game, or stop playing altogether. Similar history data may be collected for other types of activity data. In some embodiments, the user's gaming and/or other history may be analyzed to develop trends associated with the user account records.

By way of example, the activity data may include a user's purchasing history. The user's purchasing history may be monitored or calculated in a number of ways. The purchasing history may include a record of all transactions with the user. The purchasing history may also include the frequency at which the user conducts transactions and/or the amount of money the user spends over a certain period of time, on average, such as an average amount spent seasonally or annually, or an average transaction value. The purchasing history may also include a record of all transactions the user made virtually or online. For example, the purchasing history may include the amount of money the user spends for points, the virtual items the user purchased, and/or the amount the user bet in a wagering game. The purchasing history may also include the frequency at which the user conducts transactions online and/or the amount the user spends over a certain period of time, on average, such as an average amount spent seasonally or annually, or an average transaction value.

In addition to user's behavior onsite, the activity data may include a user's online behavior, such as information and activity related to a social gaming or networking platform, the connections the user has, or the user's identified interests, activities, and interactions with other users. Further, the activity data may include a user's actions on a website. For example, the activity data may include the user's online purchase history. For services-related industries, such as the travel industry, the activity data may include data related to the user's preference for booking travel plans through a website as opposed to other methods. The activity data may also include the frequency at which the user visits a website and engages in a certain activity. For example, the activity data related to an online gaming website may include the user's purchase history, quest purchase history, gaming history, win rates, or preferences for playing certain types of games or at certain time periods. Similarly, the activity data may include a user's use of a mobile application.

In some embodiments, the data integration server may transmit data (e.g., including user account data, first identity data, second identity data, activation data, and/or validation data) to the award management server periodically or according to a predetermined schedule. Additionally and alternatively, data may be transmitted to the award management server in batches or when triggered by an event. For example, the data integration server may transmit data to the award management server when a user activates an award enhancement option, when a user starts a required activity, when a user reaches a certain level in the required activity, and/or when other predetermined events happen.

In some embodiments, the award management server may determine the popularity of an award enhancement option. For example, to analyze how many users activated an award enhancement option, the award management server may transmit a specific query or poll request to a data integration server. Upon receiving the request, the data integration server may transmit data related to activated award enhancement options, including how many users activated each award enhancement option. Based on the reported data, the award management server may generate reports about award enhancement options, including which award enhancement options were most popular and how many users activated each award enhancement option.

In some embodiments, the award management server may provide one or more graphical user interfaces to receive configuration data from an administrator for defining and managing award enhancement options. With configuration data, an administrator may define and instantiate an award enhancement option. For example, configuration data may include a name of an award enhancement option, a description of the award enhancement option, an icon of the award enhancement option, a type of the award enhancement option, a target amount, a reward of the award enhancement option, a type of game, a type of activity, location information, date and timing information, and/or any other configuration data for defining an award enhancement option. In response to receiving the configuration data, the award management server may issue, publish (through websites and pages), and manage award enhancement options. The award management server may transmit data related to an award enhancement option to one or more servers (e.g., server(s) 330 in FIG. 3). Based on the data, the one or more servers may enable users to active the available award enhancement option.

Consistent with some embodiments of this disclosure, a system for managing user account data and award redemptions may include one or more servers. For example, a first server may store first identity data representing an identity of the user and activation data identifying an award enhancement option associated with account data of the user. A second server may be communicatively coupled to the first server. The second server may receive second identity data and validation data associated with the user. The second identity data may include data representing an identity of the user, and the validation data may be analyzed to confirm that the user is eligible for an award. The second server may query the first server based on the second identity data and obtain the activation data stored in association with the account data of the user along with other data, such as validation data and user data. Based on at least one of the validation data and the activation data, the second server may determine whether the user qualifies for the award enhancement option for the award. When it is determined that the user qualifies for the award enhancement option for the award, the second server may automatically update the account data of the user to include redemption data indicating that the user is authorized to receive the award enhancement option. As will be appreciated, the functions of the first and second servers may be combined into a single server or collection of server(s). Other system arrangements and architectures may be utilized depending on the application and desired uses.

Figure 12:
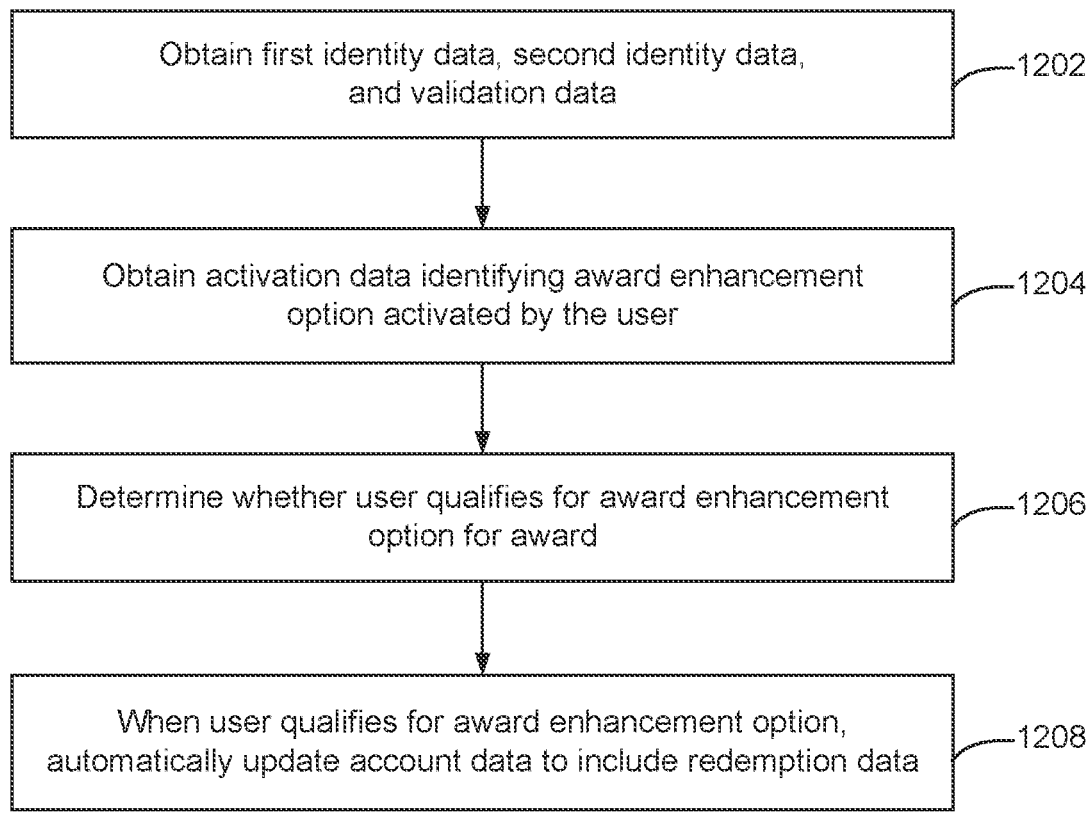
FIG. 12 is a flowchart of another example method for managing user account data and award redemptions, consistent with embodiments of this disclosure.

FIG. 12 illustrates another example method 1200 for managing user account data and award redemptions, consistent with embodiments of this disclosure. Method 1200 may be implemented with computing apparatus and systems, such as those described herein (see, e.g., FIGS. 1-3). In some embodiments, method 1200 may be performed by one or more servers (e.g., a data integration server and/or an award management server). The order and sequence of the steps in method 1200 may be modified and/or rearranged, and other steps may be added, substituted or combined. Thus, embodiments of the present disclosure are not limited to the example method 1200.

As illustrated in FIG. 12, at step 1202, the at least one server may obtain first identity data representing an identity of a user (e.g., user 402 of FIG. 4), second identity data including data representing an identity of the user, and validation data associated with the user and confirming that the user is eligible for an award. Such data may be obtained at the same time or separately through one or more data queries and/or transmissions.

At step 1204, the at least one server may obtain activation data identifying an award enhancement option (e.g., the award enhancement option described in association with FIGS. 8-10) that was activated by the user. As part of step 1204 or separately (e.g., as part of step 1202 or otherwise), other data stored in association with the account data of the user may be obtained by the server, such as activity data and/or other user data.

At step 1206, based on at least one of the validation data and the activation data, the at least one server may determine whether the user qualifies for the award enhancement option for the award. As part of step 1206, the server may also analyze other data to determine a user's qualification, such as activity data.

At step 1208, when it is determined that the user qualifies for the award enhancement option for the award, the at least one server may automatically update the account data of the user to include redemption data indicating that the user is authorized to receive the award enhancement option.

In some embodiments, besides steps 1202-1208, the at least one server may further generate reporting data to report authorization of the award enhancement option to the user.

In some embodiments, besides steps 1202-1208, the at least one server may further update the account data to include an award enhancement based on the award enhancement option. For example, the award enhancement may include data representing at least one of a credit, a voucher, a coupon, a discount, one or more points, an advancement, a multiplied award, a prize, a pass, a subscription, or an enrollment.

In some embodiments, the at least one server may obtain from at least one reporting device (e.g., one or more reporting device(s) 310 in FIG. 2), activity data in response to the user performing one or more activities. For example, the at least one reporting device may include a gaming server, a website server, an electronic gaming machine, a security server, a smartphone, a point-of-sale device, a bar code reader, a magnetic card reader, a contactless chip detector, a biometric reader, a video camera, a geo-location detector, and/or a beacon reader. As another example, the one or more activities comprises at least one of the user visiting a website, the user visiting a physical location, the user staying at a physical location for a predetermined amount of time, the user playing an online game, the user playing a game at a physical location, and/or the user achieving a predetermined achievement or result in a designated game.

In some embodiments, the at least one server may validate the identity of the user. In some embodiments, the at least one processor may further determine whether the user qualifies for the award enhancement option for the award based on the activity data stored with the account data of the user.

In some embodiments, the at least one server may further enable the user to enroll, through an online platform operated on a server, in a promotion to receive the award. When the user enrolls in the promotion, the at least one processor may further generate the validation data confirming that the user is eligible for the award associated with the promotion.

In some embodiments, the at least one server may further enable the user to activate the award enhancement option by applying points (e.g., points 404 in FIGS. 4-9) obtained by the user by playing at least one online game executed through a server or completing other activities monitored by one or more reporting devices.

In some embodiments, the at least one server may further determine whether a required activity is performed by the user on or before a predetermined expiration date or within a validity period. By proceeding validation data and/or activity data, the at least one server may determine that the user is qualified for the award enhancement option for the award when the required activity is determined to be performed on or before the expiration date or within a validity period.

In some embodiments, as part of method 1200, the award may be a first award and the validation data may include first award data identifying the first award. Further, the activation data for the award enhancement option may include second award data identifying a second award associated with the award enhancement option. The at least one server may determine whether the user is qualified for the award enhancement option by comparing the first award data with the second award data. If the first award and the second award are the same award, then the user is determined to be qualified to redeem the award enhancement option. Additionally or alternatively, other conditions or criteria may be applied before determining that the user is qualified to redeem the award enhancement option.

In some embodiments, the at least one server may generate one or more graphical user interfaces (e.g., one or more of GUIs 400-1000) to display user account data and available award enhancement options. The graphical user interfaces may enable a user to redeem points and activate an award enhancement option. Further, the graphical user interfaces may provide information to the user to confirm when an award enhancement option is activated and when the user is authorized to receive the award enhancement option.

In some embodiments, the at least one server may operate or host an online platform that enables a plurality of users to play one or more online games and obtain credits to activate award enhancement options.

Embodiment of the present disclosure may be implemented through any suitable combination of hardware, software, and/or firmware. Modules and components of the present disclosure may be implemented with programmable instructions implemented by a hardware processor. In some embodiments, a non-transitory computer-readable storage medium including instructions is also provided, and the instructions may be executed by a processor device for performing the above-described steps and methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory. Examples of networks for supporting the herein described connections and communication of data feeds and information include private and public networks, including intranets, local area networks, and wide area networks (including the Internet). Such networks may include any combination of wired and wireless networks and support associated communication protocols.

It should be noted that, the relational terms herein such as "first" and "second" are used only to differentiate an entity or operation from another entity or operation, and do not require or imply any actual relationship or sequence between these entities or operations. Moreover, the words "including," "having," "including," and "including," and other similar forms are intended to be equivalent in meaning and be open ended in that an item or items following any one of these words is not meant to be an exhaustive listing of such item or items, or meant to be limited to only the listed item or items.

It is appreciated that the above-described embodiments may be implemented by hardware, or software (program codes), or a combination of hardware and software. If implemented by software, it may be stored in the above-described non-transitory computer-readable media. The software, when executed by the processor may perform the disclosed methods. The computing units and other functional units described in this disclosure may be implemented by hardware, or software, or a combination of hardware and software. One of ordinary skill in the art will also understand that the above-described servers may be combined as one server, and each of the above-described servers may be further divided into a plurality of sub-servers. For example, there may be a single physical computer for the data integration server, the website server, and the award management server.

In the foregoing specification, embodiments have been described with reference to numerous specific details that may vary from embodiment to embodiment. Certain adaptations and modifications of the described embodiments may be made. Other embodiments may be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art may appreciate that these steps may be performed in a different order while implementing the same method.

What is claimed is:

1. A computer-implemented system for managing user account data and award redemptions, the system comprising:

a web server configured to operate an online platform that enables a user to activate an award enhancement option for an award;

a data integration server communicatively coupled to the web server, the data integration server including one or more data collection engines configured to operate a data extraction and transformation, and wherein the data integration server is configured to:

receive, from the web server, first identity data representing an identity of the user and activation data identifying the award enhancement option activated by the user;

translate or configure, using the one or more data collection engines, the first identity data and the activation data into a common or destination data format or protocol; and store, in a memory device, the translated or configured activation data with account data of the user; and an award management server communicatively coupled to the data integration server and configured to:

receive second identity data and validation data associated with the user, the second identity data including data representing an identity of the user, and the validation data confirming that the user is eligible for the award;

query the data integration server based on the second identity data, analyze data stored in the data integration server to synchronize various types of data associated with the account data of the user, and obtain the activation data associated with the account data of the user;

determine, based on at least one of the validation data and the activation data, whether the user qualifies for the award enhancement option for the award; and when it is determined that the user qualifies for the award enhancement option, automatically update the account data of the user to include redemption data indicating that the user is authorized to receive the award enhancement option.

2. The system of claim 1, wherein the award management server is further configured to generate reporting data to report authorization of the award enhancement option to the user.

3. The system of claim 1, wherein the award management server is further configured to update the account data to include an award enhancement based on the award enhancement option.

4. The system of claim 3, wherein the award enhancement includes data representing at least one of a credit, a voucher, a coupon, a discount, one or more points, an advancement, a multiplied award, a prize, a pass, a subscription, or an enrollment.

5. The system of claim 1, wherein the system further comprises:

at least one reporting device communicatively coupled to the data integration server, each reporting device configured to generate activity data in response to the user performing one or more activities, wherein the data integration server is further configured to store, in the memory device, the activity data with the account data of the user.

6. The system of claim 5, wherein each reporting device is further configured to:

validate the identity of the user; and when the identity of the user is validated, transmit the second identity data with the activity data to the data integration server.

7. The system of claim 5, wherein the at least one reporting device comprises at least one of a gaming server, an electronic gaming machine, a security server, a smartphone, a point of sale device, a bar code reader, a magnetic card reader, a contactless chip detector, a biometric reader, a video camera, a geo-location detector, or a beacon reader.

8. The system of claim 5, wherein the one or more activities comprises at least one of the user visiting a website, the user visiting a physical location, the user staying at a physical location for a predetermined amount of time, the user playing an online game, the user playing a game at a physical location, or the user achieving a predetermined achievement or result in a designated game.

9. The system of claim 5, wherein the award management server is further configured to determine whether the user qualifies for the award enhancement option for the award based on the activity data stored with the account data of the user.

10. The system of claim 1, wherein the web server is further configured to:

enable the user to enroll, through the online platform, in a promotion to receive the award; and when the user enrolls in the promotion, the web server is further configured to generate the validation data confirming that the user is eligible for the award associated with the promotion.

11. The system of claim 1, wherein the web server is further configured to enable the user to activate the award enhancement option by applying points obtained by the user by playing at least one online game.

12. The system of claim 1, wherein the award management server is further configured to:

determine whether a required activity is performed by the user on or before a predetermined expiration date; and determine that the user is qualified for the award enhancement option for the award when the required activity is determined to be performed on or before the expiration date.

13. A computer-implemented method for managing user account data and award redemptions, the method being performed by a web server, a data integration server that is communicatively coupled to the web server, and an award management server that is communicatively coupled to the data integration server, the method comprising:

operating, with the web server, an online platform that enables a user to activate an award enhancement option for an award;

receiving, at the data integration server and from the web server, first identity data representing an identity of the user and activation data identifying the award enhancement option activated by the user;

translating or configuring, using one or more data collection engines included in the data integration server, the first identity data and the activation data into a common or destination data format or protocol, wherein the one or more data collection engines is configured to operate a data extraction and transformation;

storing, by the data integration server and in a memory device, the translated or configured activation data with account data of the user;

receiving, at the award management server, second identity data and validation data associated with the user, the second identity data including data representing an identity of the user, and the validation data confirming that the user is eligible for the award;

querying, with the award management server, the data integration server based on the second identity data, analyzing data stored in the data integration server to synchronize various types of data associated with the account data of the user, and obtaining and obtain the activation data associated with the account data of the user; and determining, with the award management server and based on at least one of the validation data and the activation data, whether the user qualifies for the award enhancement option for the award;

wherein when it is determined that the user qualifies for the award enhancement option, automatically updating the account data of the user to include redemption data indicating that the user is authorized to receive the award enhancement option.

14. The computer-implemented method of claim 13, further comprising generating, with the award management server, reporting data to report authorization of the award enhancement option to the user.

15. The computer-implemented method of claim 13, further comprising updating, with the award management server, the account data of the user to include an award enhancement based on the award enhancement option.

16. The computer-implemented method of claim 15, wherein the award enhancement includes data representing at least one of a credit, a voucher, a coupon, a discount, one or more points, an advancement, a multiplied award, a prize, a pass, a subscription, or an enrollment.

17. The computer-implemented method of claim 13, further comprising obtaining, from at least one reporting device communicatively coupled to the data integration server, activity data in response to the user performing one or more activities.

18. The computer-implemented method of claim 17, further comprising validating, with the at least one reporting device, the identity of the user.

19. The computer-implemented method of claim 17, wherein the at least one reporting device comprises at least one of a gaming server, a website server, an electronic gaming machine, a security server, a smartphone, a point of sale device, a bar code reader, a magnetic card reader, a contactless chip detector, a biometric reader, a video camera, a geo-location detector, or a beacon reader.

20. The computer-implemented method of claim 17, wherein the one or more activities comprises at least one of the user visiting a website, the user visiting a physical location, the user staying at a physical location for a predetermined amount of time, the user playing an online game, the user playing a game at a physical location, or the user achieving a predetermined achievement or result in a designated game.

21. The computer-implemented method of claim 17, further comprising determining, with the award management server, whether the user qualifies for the award enhancement option for the award based on the activity data stored with the account data of the user.

22. The computer-implemented method of claim 13, further comprising:

enabling the user to enroll, through an online platform operated on the web server, in a promotion to receive the award; and when the user enrolls in the promotion, generating the validation data confirming that the user is eligible for the award associated with the promotion.

23. The computer-implemented method of claim 13, further comprising enabling the user to activate the award enhancement option by applying points obtained by the user by playing at least one online game executed through the web server.

24. The computer-implemented method of claim 13, further comprising:

determining whether a required activity is performed by the user on or before a predetermined expiration date; and when the required activity is determined to be performed on or before the expiration date, determining that the user is qualified for the award enhancement option for the award.

\* \* \* \* \*

UNITED STATES PATENT AND TRADEMARK OFFICE
CERTIFICATE OF CORRECTION

| | | |
|---|---|---|
| PATENT NO. | : 12,086,827 B2 | Page 1 of 1 |
| APPLICATION NO. | : 17/971011 | |
| DATED | : September 10, 2024 | |
| INVENTOR(S) | : James F. Dorris, Jr. et al. | |

It is certified that error appears in the above-identified patent and that said Letters Patent is hereby corrected as shown below:

In the Claims

Claim 13, Column 43, Line 3, "and obtaining and obtain" should read --and obtaining--.

Signed and Sealed this
Second Day of September, 2025

Coke Morgan Stewart
*Acting Director of the United States Patent and Trademark Office*